US005401962A

United States Patent [19]

Ferran

[11] Patent Number: 5,401,962

[45] Date of Patent: Mar. 28, 1995

[54] RESIDUAL GAS SENSOR UTILIZING A MINIATURE QUADRUPOLE ARRAY

[75] Inventor: Robert J. Ferran, San Diego, Calif.

[73] Assignee: Ferran Scientific, San Diego, Calif.

[21] Appl. No.: 76,161

[22] Filed: Jun. 14, 1993

[51] Int. Cl.[6] ........................ B01D 59/44; H01J 49/00

[52] U.S. Cl. ........................ 250/292

[58] Field of Search ........................ 250/281, 292

[56] References Cited

U.S. PATENT DOCUMENTS

| | | | |
|---|---|---|---|
| 3,641,340 | 2/1972 | van der Grinten et al. | 250/292 |
| 4,328,614 | 5/1982 | Schelhorn . | |
| 4,375,719 | 3/1985 | Kent . | |
| 4,744,140 | 5/1988 | Bright . | |
| 4,885,500 | 12/1989 | Hansen et al. | 250/292 |
| 4,985,626 | 1/1991 | Margulies | 250/292 |
| 5,298,745 | 3/1994 | Kerman et al. | 250/292 |

FOREIGN PATENT DOCUMENTS

| | | | |
|---|---|---|---|
| 2737903 | 3/1979 | Germany | 250/292 |

OTHER PUBLICATIONS

German article entitled "Das elektrische Massenfilter als Massenspektrometer und Isotopentrenner", by W. Paul, H. P. Reinhard and U. von Zahn; Apr. 21, 1958.

Brochure for QZ2000® Residual Gas Analyzers "Residual Gas Analysis, PPM Analysis, Multiplexing", from Leybold Inficon Inc.

*Primary Examiner*—Bruce C. Anderson

*Attorney, Agent, or Firm*—Knobbe, Martens Olson & Bear

[57] ABSTRACT

A residual gas sensor, suitable for mounting within an low pressure chamber, includes an array of quadrupoles formed from a plurality of parallel rods mounted in a cantilevered fashion in a glass seal. Sixteen parallel rods form an array of nine quadrupoles with adjacent quadrupoles sharing adjacent rods. A filament emitting electrons ionize gas molecules present in the low pressure chamber. These ions enter channels in the center of each quadrupole and are accelerated towards a collector having a surface mounted within each channel of each quadrupole. Voltages are applied to the rods thereby creating an identical electric field within the channels of each quadrupoles of the array. By varying the voltages applied to the rods, the electric field within the channels can be tuned to permit only ions having a specific mass-to-charge ratio to make contact with the collector. By analyzing the current generated by the ions making contact with the collector at different voltages, the presence and quantity of gases present in the low pressure chamber can be determined.

21 Claims, 10 Drawing Sheets

RESIDUAL GAS SENSOR UTILIZING A MINIATURE QUADRUPOLE ARRAY

BACKGROUND OF THE INVENTION

1. Field of the Invention

The present invention generally relates to quadrupole array based residual gas sensor and, in particular, is concerned with a residual gas sensor which utilizes a miniaturized quadrupole array to sense the presence of certain gases within low pressure chambers and a process for manufacturing the same.

2. Description of the Prior Art

Quadrupole residual gas sensors are well known in the art and are used for detecting the presence of specific gases within a chamber in near vacuum conditions, e.g., at pressures of $1\times10^{-5}$ Torr or below. The typical prior art quadrupole residual gas sensor includes four parallel rods, with equal lengths, precisely arranged and mounted on a ceramic base in a square configuration, thus forming a quadrupole, with an open area, or channel, at the center and extending the full length, of the rods. An electron source generates electrons at one end of the quadrupole which collide with, and ionize, some of the remaining gas molecules in the chamber. Some of these ions are then accelerated through the channel toward a collector positioned at the other end of the quadrupole. The ions that impact upon the collector generate a voltage potential upon the collector proportional to the number of ions and thus proportional to the population of gas molecules within the chamber. When the collector is connected to external circuitry, a current, proportional to the amount of ions impacting upon the collector is thereby generated.

Voltages are induced on the four parallel rods comprising the quadrupole. These voltages are tuned to generate an electric field in the channel between the four rods which permits only ions with a specific mass-to-charge ratio to trail the full length of the channel to the collector. Ions with other mass-to-charge ratios are pulled by the electric field from the channel to one of the four parallel rods and neutralized. Hence, by tuning the voltages on the rods for different mass-to-charge ratios, and by analyzing the current generated by ions impacting on the collector at these voltages, the quadrupole can be used to detect the presence of different gases within a chamber under low pressure or near vacuum conditions. The ability to sense these gases is important for such applications as thin-film deposition in semiconductor device processing as the presence of a specific gas in a near vacuum chamber during thin-film deposition may result in ruined devices.

For a quadrupole residual gas sensor to be able to operate in the above manner, the rods comprising the quadrupole must be precisely mounted with each of the rods parallel to each other and exactly located in the square quadrupole configuration. Heretofore, these rods have been mounted in holes precision drilled in a ceramic base. To achieve sufficiently precise positioning of the rods, as well as to maintain the low pressure integrity of the sensor, the holes typically have to be machine drilled to extremely low tolerances, e.g., 0.2 mil. The rods must then be precisely positioned within these holes in the ceramic base in the parallel, quadrupole configuration. The rods are typically secured to the ceramic base by either nuts or screws which must be precisely tightened to exact torque measurements to avoid any shifting of the rods from the parallel quadrupole configuration. Further, the electrical connections to the rods, as well as the mounting of other components on the sensor must also be made in an extremely precise and delicate fashion to ensure that the rods remain in the exact quadrupole configuration.

Unfortunately, the precision drilling of the ceramic base and the precision mounting of the rods during assembly make prior art quadrupole residual gas sensors extremely expensive to manufacture. Consequently, prior art quadrupole residual gas sensors are typically very expensive to buy, so expensive in fact, that when the sensors become dirty after continued operation, they are usually disassembled and cleaned rather than replaced with a clean sensor. However, after cleaning, re-assembling the sensor still involves precise and careful mounting and handling of the components of the quadrupole. Hence, while cleaning the sensor is less expensive the replacing the sensor, cleaning the sensor is still very expensive.

Further, the extremely precise tolerances needed to construct the sensor with the ceramic base requires larger sensor components. Specifically, since screws and/or nuts are used to secure and seat the rods within the holes drilled in the ceramic base, the rods must have a sufficient diameter to permit the attachment and tightening of these nuts and screws. For these reasons, the cylindrical rods used to construct prior art quadrupole assemblies typically are at least a $\frac{1}{4}''$ in diameter.

One consequence of using large diameter rods mounted in a ceramic base to construct a quadrupole residual gas sensor is that the rods must be spaced farther apart in order to obtain a channel between the rods where the electric field can be tuned for ions having a specific mass-to-charge ratio. However, if the rods are farther apart, the electric field produced by each rod must still be the same in order to cause ions with the wrong mass-to-charge ratio to leave the channel. Unfortunately, however, expensive equipment is required to produce such high voltages.

Due to the difficulties and costs associated with manufacturing the above-described prior art quadrupole sensor, existing sensors are generally limited to a single four-rod quadrupole. An array of quadrupoles can be used to obtain a highly sensitive residual gas sensor. While an array of quadrupoles has been previously been suggested in a paper entitled *Das elektrische Massenfilter als Massenspektrometer und Isotopentrenner,* Paul, et al., Zeitschrift fur Physik, Bd., Apr. 21, 1958, the practical difficulties and high cost described above with constructing a sensor with just one quadrupole effectively prevents construction of a cost effective sensor incorporating an array of quadrupoles. Specifically, the cost of precisely drilling holes in a ceramic base to accommodate an array of rods, and the cost of precisely positioning the rods, effectively prevent the manufacture of an affordable quadrupole array based sensor. Further, as described above, the rods comprising the array would still have to be large diameter rods, spaced relatively far apart. Consequently, the size of an array of quadrupoles manufactured using the known techniques would be sufficiently large to limit its use in most low pressure or vacuum chambers.

Currently, the selectivity of the single prior art quadrupole sensor described above can only be improved by both increasing the length of the rods to lengthen the distance the ions must travel to the collector, and by increasing the frequency of the AC component of the voltages applied to the rods to create a more rapidly fluctuating electric field.

Typically, prior art quadrupole residual gas sensors have rods about 4 to 6 inches long. To maximize the sensitivity of the sensor, however, the length the ions must travel in the channel to the collector must be less than the mean free path of the ions. The mean free path of an ion is the mean distance the ion will travel in a straight line through its environment prior to colliding with another molecular particle. The channel length must, preferably, be less than the mean free path of the particle to thereby minimize the likelihood of an ion, with the tuned mass-to-charge ratio, colliding with another particle and being deflected out of the channel or neutralized. Tuned ions which are deflected in this manner will not impact upon the collector, resulting in a lower current being detected at the collector. The mean free path of a particle, such as an ion, can be calculated by a well known formula in which the mean free path is inversely proportional to the pressure of the environment that the particle is in. Hence, prior art quadrupole residual gas sensors must operate at extremely low pressures, e.g., $5\times10^{-5}$ Torr, to be able to obtain a mean free path greater than the length of the channel between the ion source and the collector.

In many applications where there is a need to determine what gases exist in a chamber, the pressure in the chamber is substantially higher than the pressures necessary to operate the prior art sensor. For example, in the film deposition techniques used in the manufacture of semiconductor devices, the films are often deposited in chambers where the pressure may even be two orders of magnitude greater than the pressure needed to operate the above-described prior art sensors.

Consequently, the user is then reduced to sampling the contents of the low pressure chamber into a separate chamber, and then lowering the pressure in the separate chamber to obtain the pressure needed for the sensor to operate. As can be appreciated, the additional hardware necessary to implement such sampling is very expensive, and sampling is inherently inaccurate. Further, in these applications, the quadrupole residual gas sensor is not embedded in the low pressure chamber where the gas is being sensed, it is mounted in an extraneous chamber.

Consequently, there is a need in the prior art for an inexpensive residual gas sensor which uses an array of quadrupoles to increase sensitivity. Further, there is an additional need in the prior art for a sensor capable of operating at higher pressures to eliminate the costs and inaccuracies associated with sampling the contents of a low pressure chamber and to permit the sensor to be directly embedded in the chamber. Finally, there is a need in the prior art for both an inexpensive method of manufacturing these improved sensors, and an apparatus to facilitate such manufacturing.

SUMMARY OF THE INVENTION

The aforementioned needs are satisfied by the present invention comprising a gas sensor which includes a plurality of rods arranged in parallel and spaced apart from each other to form an array of quadrupoles. The rods are mounted in a glass base which permits the rods to be fixedly secured in position to form the array of quadrupoles while still maintaining the low pressure integrity of the sensor.

The sensor also includes an electron source capable of ionizing gas molecules present within the low pressure chamber. The ions are then induced to travel down channels between the rods forming the array of quadrupoles towards a collector. The collector generates an electrical signal proportional to the number of ions that make contact with the surfaces of the collectors mounted within the channels of the quadrupoles.

Voltages can then be applied simultaneously to each of the rods of the array of quadrupoles which tune each of the quadrupoles of the array to permit only ions having a specific mass-to-charge ratio and Atomic Mass Unit (AMU) to reach the surface of the collector. The sensor of the present invention can also include a number of lenses mounted in the channels of the quadrupole which also further tune the quadrupoles to permit only ions having the tuned mass-to-charge ratio to reach the surface of the collector.

Another aspect of the present invention is a method of manufacturing a quadrupole array based gas sensor which includes the steps of positioning a plurality of rods in an array of quadrupoles, positioning a glass bead on the plurality of rods, and then heating the glass bead to melt the glass bead and cause the glass to grip the rods and hold the rods within the array. Yet another aspect of the present invention is a reusable apparatus for manufacturing a quadrupole array based gas sensor which permits the rods to be correctly positioned to form an array of quadrupoles, as well as permitting the glass bead to then be appropriately positioned to secure the rods in place after the glass is heated.

These and other objects and features of the present invention will become more fully apparent from the following description and appended claims taken in conjunction with the accompanying drawings.

DETAILED DESCRIPTION OF THE PREFERRED EMBODIMENT

Reference is now made to the drawings wherein like numerals refer to like parts throughout. The components comprising the residual gas sensor using a miniature quadrupole array of the present invention will now be described in reference to FIGS. 1, 2, 3 and 4. The operation of the sensor will then be described in reference to FIGS. 5, 6, 7 and 8. Finally, the fabrication of the basic quadrupole array structure of the present invention will then be described in reference to FIG. 9, 10*a*, 10*b*, 10*c* and 11.

Figure 1:
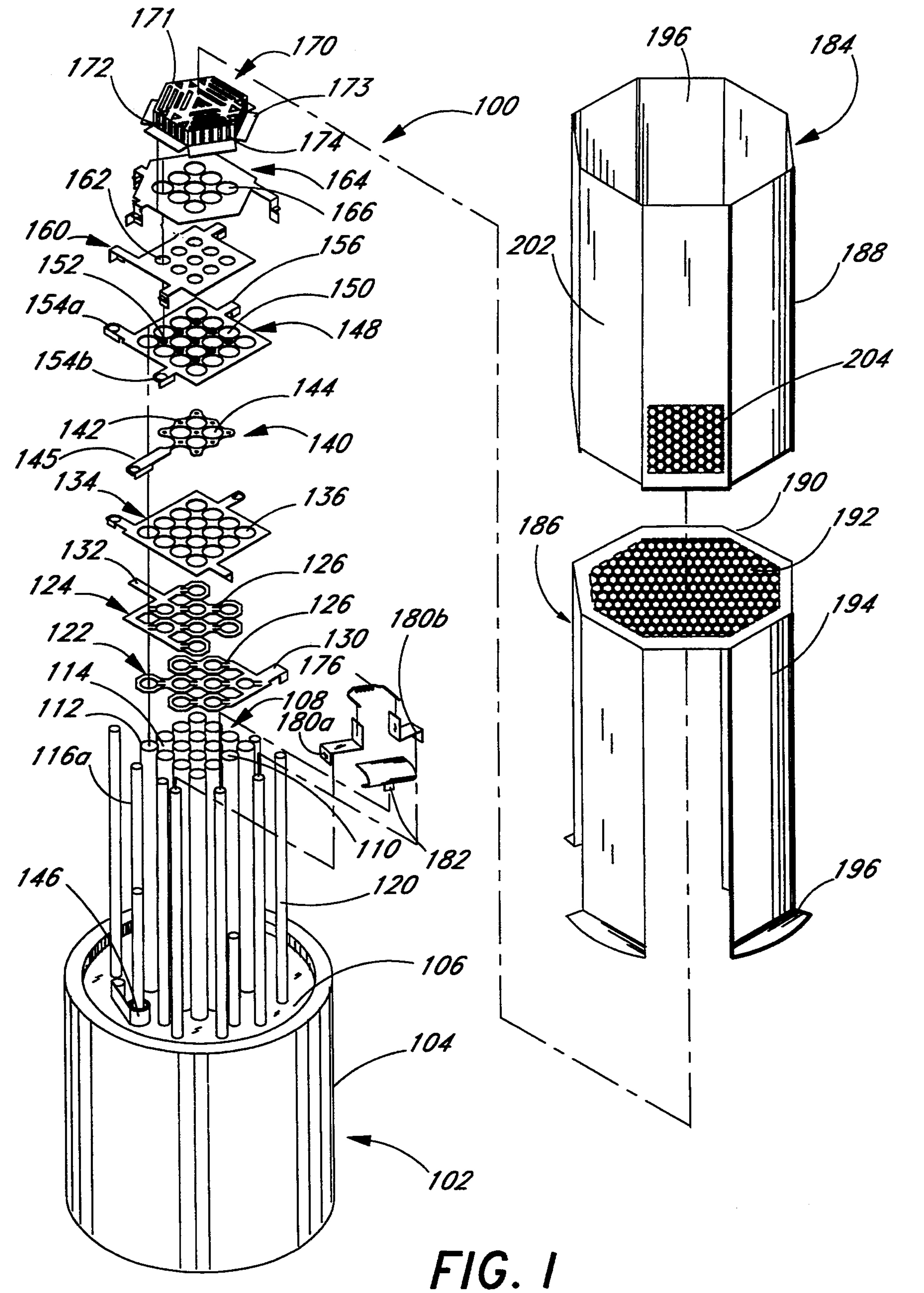
FIG. 1 is an exploded perspective view of the residual gas sensor utilizing a miniature quadrupole array of the present invention.
Figure 2:
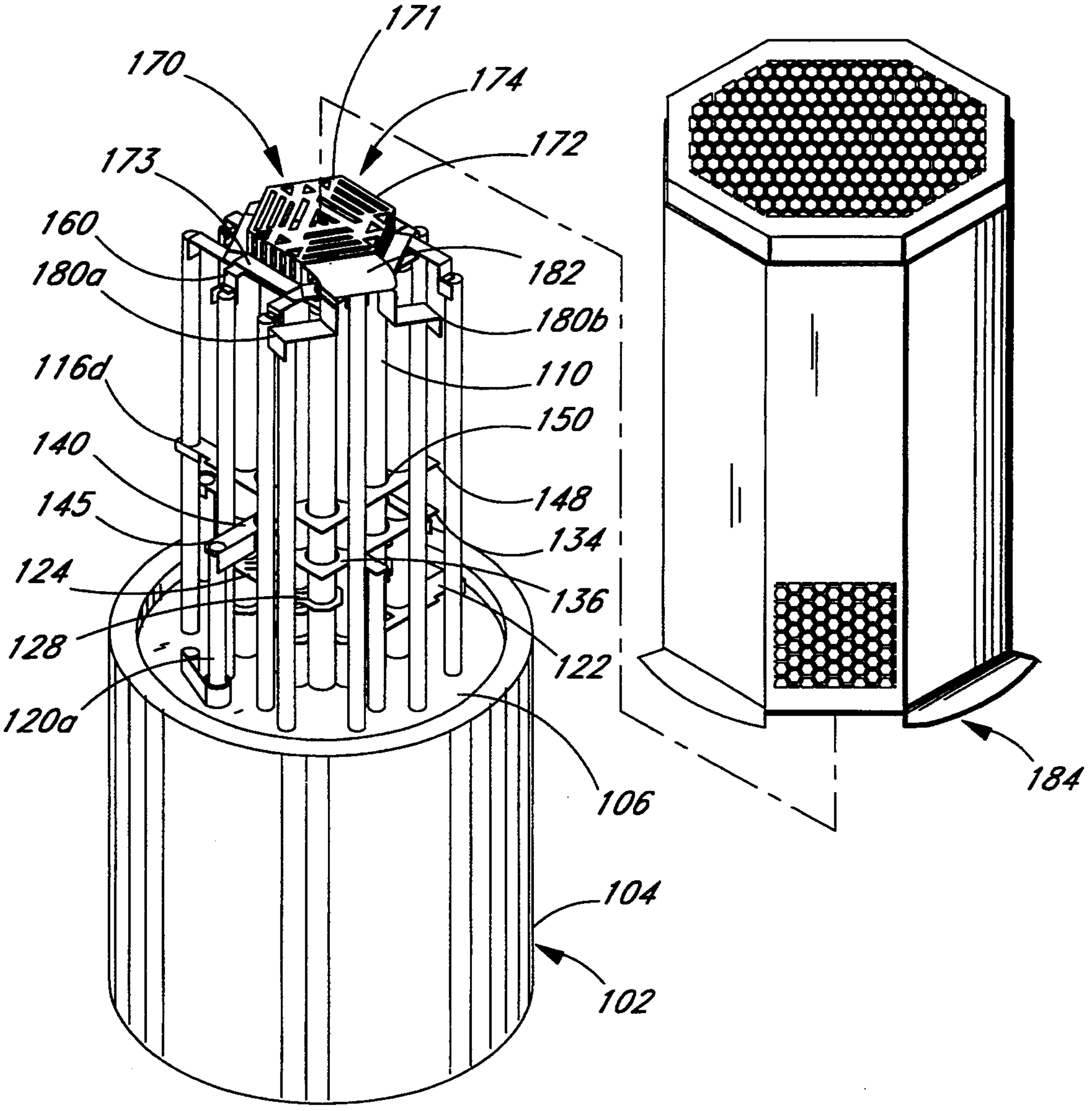
FIG. 2 is a perspective view of the assembled residual gas sensor of the present invention shown in FIG. 1.
Figure 3:
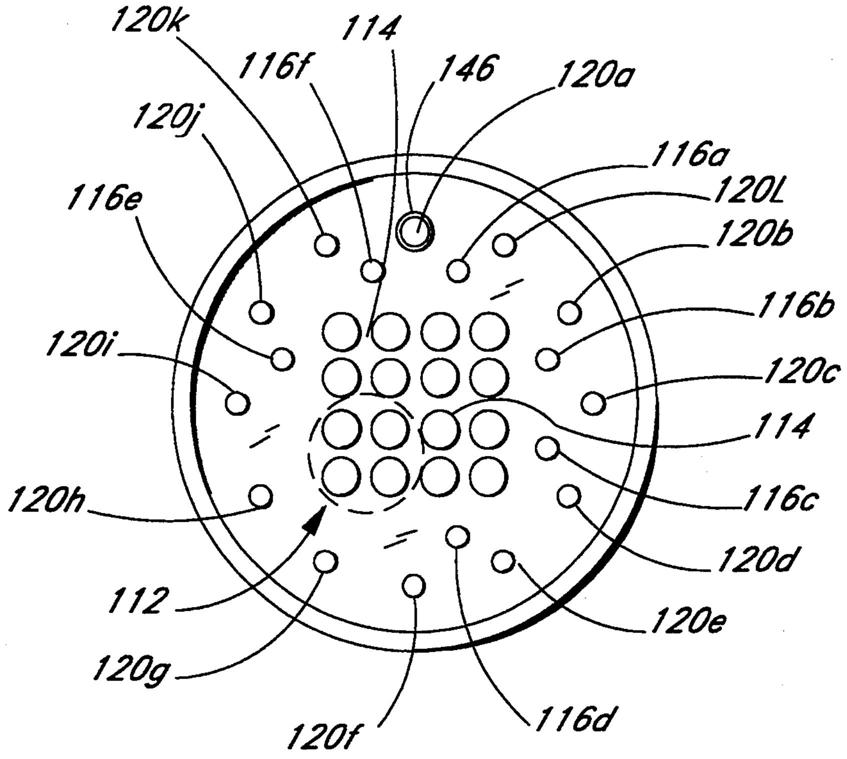
FIG. 3 is a top view of the residual gas sensor of FIGS. 1 and 2 illustrating the position of the rods, the pins and the support members.

FIG. 1 shows an exploded perspective view of one presently preferred embodiment of a residual gas sensor 100, using a miniature quadrupole array, illustrating the various components comprising the sensor 100. FIG. 2 shows a perspective view of the sensor 100 shown in FIG. 1 in its assembled state. FIG. 3 shows a top view of the rods comprising the quadrupole array, and the pins to which the components of the sensor are electrically connected as well as the support members supporting the various components of the sensor 100.

Referring now to FIG. 1, the basic components of the sensor 100 are mounted on a cylindrical base 102 comprising a hollow cylindrical metal body or casing 104 having a solid glass seal 106 formed therein to provide a gas-tight seal. The cylindrical base 102 typically has a diameter on the order of ⅝ inch and is approximately ½ inch to ⅝ inch long. The material comprising the hardened glass seal 106 is selected so that after assembly of the sensor 100, the glass seal 106 securely retains embedded rods, supports and pins, described below, in structurally stable positions and orientations. Further, the material comprising the glass seal 106 is selected to provide a vacuum tight seal with these rods, supports and pins as well as with the interior walls of the base casing 104. The material used to form the glass seal 106 is preferably a pre-formed glass blank or glass bead 105 (FIG. 9) having a circular disk shape and having holes for each of the rods, pins and support members, described below. The pre-formed glass bead 105 is heated causing the glass to melt into the hardened glass seal 106 which securely bonds to each of the rods, pins and support members as well as to the interior walls of the base casing 104. The glass bead 105 used to form the hardened glass seal 106 is selected to have thermal coefficients similar to the thermal coefficients of the base casing 104 and having a suitable behavior when heated in an oven. Various types of glass may be used for the glass bead 105 depending upon the other materials in the gas analyzer and depending upon the temperature range of the expected use of the gas analyzer. For example, in the preferred embodiment described herein, the base casing 104 is stainless steel, and the glass bead 105 comprises a barium alkali glass having a relatively high temperature coefficient close to the temperature coefficient of stainless steel. The fabrication process by which the rods, supports and pins are mounted in the glass seal 106 is described in greater detail in reference to FIGS. 9, 10*a*, 10*b*, 10*c* and 11 below.

An array 108 of sixteen identical cylindrical rods 110 is mounted in the glass seal 106 in a cantilevered fashion with the glass seal 106 serving as a mounting base for the cantilevered rods. Alternatively, other mounting bases, such as ceramic, photoformed glass and epoxy, may be used to support the rods in a cantilevered array as illustrated in FIG. 1.

The sixteen cylindrical rods 110 are precisely positioned and fixedly secured within the glass seal 106 in a grid-like pattern of four identically spaced rows of four rods 110 each. Each rod 110 extends perpendicularly outward from the base 102 an equal distance. The rods 110 of the array 108 preferably comprise either stainless steel or inconel, and, in the preferred embodiment, are 1 mm in diameter and extend outward from the surface of the glass seal 106 approximately ⅜ inch.

The rods 110 are also precisely positioned within the glass seal 106 such that, when viewed from above, the sixteen rods 110 form nine square elements 112 (see FIG. 3) where the adjacent rods 110 are shared between the adjacent elements 112. The center of each element 112 constitutes a channel 114, extending the full length of the cantilevered end of the rods 110, where the center of the channel 114 is an equal distance from center of each of the four cylindrical rods 110 of the element 112. Each of the nine elements 112, comprising four rods 110 and a channel 114 each, forms a single quadrupole of the sensor 100. Hence, in this preferred embodiment of the sensor 100, the quadrupole array forms nine square quadrupole elements 112.

Six mechanical support rods 116*a*–116*f* are also mounted in the glass seal 106 at various locations outside of the array 108 of rods 110. The support rods 116 also extend perpendicularly outward from the surface of the glass seal 106 in a cantilevered fashion. The locations of the support rods 116*a*–116*f* in the glass seal 106 are shown in FIG. 3 below. The support rods 116 are used to support various components of the sensor 100 to be described below.

Figure 4:
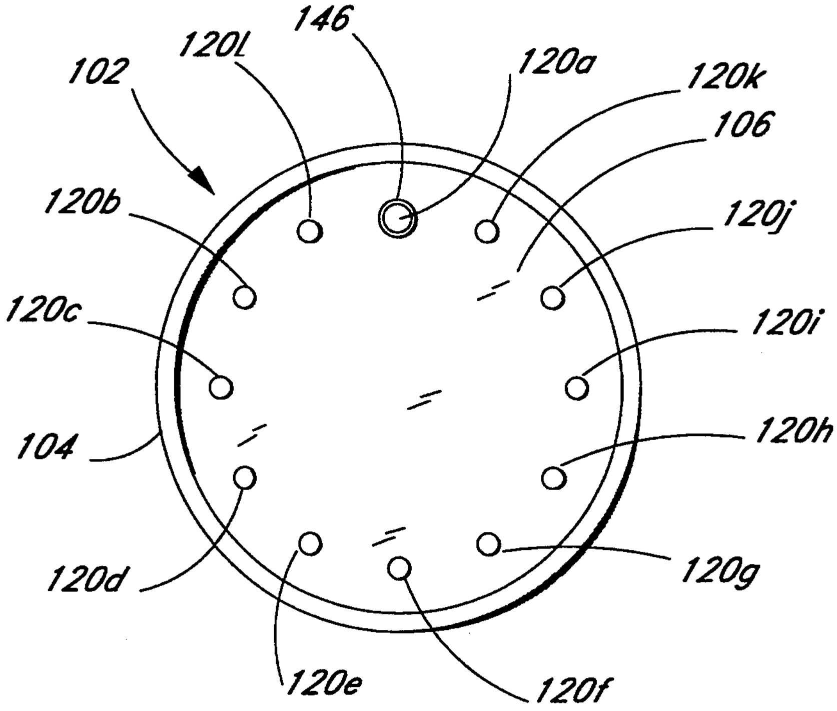
FIG. 4 is a bottom view, illustrating the pin connections of the residual gas sensor shown in FIGS. 1 and 2.

A series of cylindrical pins 120*a*–120*l*, of varying lengths, extend entirely through, and project perpendicularly outward from, both the upper and lower surfaces of the glass seal 106. The exact positions of the pins 120*a*–120*l* within the glass seal 106 is shown in FIGS. 3 and 4 below. The pins 120 make electrical connections to the rest of the components of the sensor 100 as described below, and they are mounted in the glass seal 106 in such a manner that they maintain the sealing characteristics (i.e., the low pressure, gas-tight integrity) of the base 102 of the sensor 100. Both the supports 116 and the pins 120 are preferably cylindrical with a diameter ranging from 0.5 mm to 1 mm, and preferably comprise either inconel or stainless steel. Further, the rods 116 and the pins 120 extend perpendicularly outward from the upper surface of the glass seal 106 a distance of ⅛ inch to ⅝ inch, depending upon the components to which they are attached.

Mounting the rods 110, the support members 116 and the pins 120 in the glass seal 106 allows for less expensive manufacturing because the rods 110, the support members 116 and the pins 120 can be correctly positioned in the glass blank 105 using a reusable jig or tooling assembly. Once the pre-formed glass blank 105 is heated and allowed to cool, the rods 110, the support members 116 and the pins 120 are then fixed permanently in their respective correct positions and orientations.

A positive bus 122 and a negative bus 124 are also shown in FIG. 1. The busses 122,124 are preferably constructed of thin (0.002 inch) stainless steel, and are each configured to make solid electrical connections to eight specific rods 110 of the array 108. The busses 122, 124 include eight openings 126 having a diameter slightly greater than the diameter of the rods 110. The openings 126 are preferably photo-etched into the stainless steel of the busses 122,124 using well known techniques. A tab 128 is formed on the interior surface of each opening 126. The tabs 128 bend in response to the bus bar 122,124 being pressed over the rods 110, with the rods 110 projecting through the holes 126, thereby ensuring a good electrical connection between the busses 122,124 and their corresponding rods 110 via the tabs 128 pressing against the rods 110.

The positive bus 122 is positioned within the array 108 of the rods 110 so that it makes electrical contact to only eight rods 110 and is immediately adjacent to, but does not touch, the upper surface of the glass seal 106 as shown in FIG. 2. A tab 130, integrally connected to the positive bus 122, is then spot welded to the pin 120*g* (FIG. 3) which is in turn connected to an external voltage source described below in reference to FIG. 8. The negative bus 124 then makes electrical contact with the remaining eight rods 110 of the array 108, and is positioned within the array 108 of the rods 110 adjacent to, but without touching, the positive bus 122 as is also shown in FIG. 2. A tab 132, integrally connected to the negative bus 124, is then spot welded to the pin 120*c* which is in turn connected to an external voltage source also described below in reference to FIG. 8.

The busses 122, 124 are configured such that, in any single square quadrupole element 112 (FIG. 3), two rods 110 positioned diagonally across from each other are connected to the positive bus 122, and the remaining two rods 110 positioned diagonally across from each other are connected to the negative bus 124, as is diagrammatically illustrated in FIG. 6 below. Thus, in each of the quadrupole elements 112, two of the rods 110 diagonally located from each other are supplied with a first voltage and the remaining two diagonally positioned rods 110 are supplied with a second voltage.

A shield 134 is then positioned within the array 108 of the rods 110 immediately above, but without making contact with, the negative bus 124, as shown in FIG. 2. Preferably, the shield 134 is a square plate fabricated from 0.002 inch thick stainless steel, having sixteen photo-etched openings 136, which are configured to fit around each of the rods 110. The openings 136 have a greater diameter than the rods 110 so that when the shield 134 is positioned within the array 108, above the negative bus 124, the shield 134 surrounds, without touching, each of the rods 110 and thereby occupies the channels 114 of the sensor 100. Hence, the shield 134 shields the additional components of the sensor 100, to be described below, from electrostatic effects resulting from applying voltages to the busses 122,124. The shield 134 is then spot welded to the mechanical supports 116*d* and 116*e* to securely position the shield 134 in the above described manner. Further, the shield 134 is also spot welded to the pin 120*b* to provide an electrical connection between the shield 134 and the electrical circuit of FIG. 8, as described below.

A collector 140 is then positioned within the array 108 of the rods 110 immediately above the shield 134 but without making contact with either the shield 134 or the rods 110, as shown in FIG. 2. The collector 140 includes nine surfaces 142 and four photo-etched openings 144. The openings 144 have a diameter greater than the diameter of the rods 110 permitting the collector 140 to be positioned around, but without touching, the four rods 110 in the center of the quadrupole array 108. The collector 140 is configured so that when it is positioned within the array 108 with the four centermost rods 110 extending through the openings 144, the nine surfaces 142 are centered in the channels 114 of each of the nine quadrupole elements 112. A tab 145 on the collector 140 is then spot welded to the pin 120*a*. As shown in FIGS. 3 and 4, the pin 120*a* is enclosed within a concentric metal shielding tube 146 as the pin 120*a* extends through the glass seal 106. As discussed below, the shielding tube 146 is connected to circuit ground to block any leakage currents that may be present in the glass seal 106 as a result of the high voltages on the other connector pins. The shielding tube 146 prevents these leakage currents from reaching the collector pin 120*a* so that the collector current is not affected. The collector 140 can thus transmit a current indicative of the number of ions travelling down the nine channels 114 in each quadrupole 112 (FIG. 3) to the external circuitry shown in FIG. 5 via the pin 120*a*, and thus provide an indication of the quantity of gas molecules present in the chamber into which the sensor is installed.

An upper shield 148 is then positioned within the array 108 immediately above the collector 140, as shown in FIG. 2. The upper shield 148 is so positioned such that it does not make contact with either the collector 140 or any of the rods 110. The upper shield 148 includes sixteen photo-etched openings 150 for the rods 110, the diameter of the openings 150 being greater than the diameter of the rods 110. Further, the upper shield 148 also includes nine photo-etched openings 152 positioned on the upper shield 148 so that, the openings 152 are centered in the channels 114 immediately above the center of the collector surfaces 142 when the upper shield 148 is securely positioned immediately above the collector 140 in the above-described fashion. The openings 152 act as lenses for ions travelling down the channels 114 of each of the nine quadrupole elements 112 by permitting only those ions in the center of the channels 114 to impact on the surface 142 of the collector 140. The upper shield 148 also includes two tabs 154*b*, 154*a* having openings large enough to accommodate the support member 116*f* and the pin 120*b*, respectively, and further includes a third tab 156. The upper shield 148 is then securely held in place by spot welding the tab 154*b* to the support member 116*f* and the tab 156 to the support member 116*d*. Further, the tab 154*a* is also spot welded to the pin 120*b* to provide an electrical connection between the shield 148 and the electrical circuit of FIG. 8, further described below.

An entrance lens 160 having nine photo-etched openings 162 is then positioned over the array 108 of rods 110 such that the nine openings are centered on the openings of the nine channels 114, at the cantilevered ends of the rods 110. The entrance lens 160 is mounted so that it does not make contact with any of the rods 110 of the array 108, as shown in FIG. 2. The openings 162 also act as a lenses for ions travelling towards the collector 140 by permitting only those ions travelling towards the collector 140 at substantially the center of the nine channels 114 to actually enter the channel 114. The entrance lens 160 is secured in this position by being spot welded to the support members **116*d* and 116*f*. Further, the entrance lens 160 is also spot welded to the pin 120*b* providing an electrical connection between the entrance lens 160 and the electrical circuit of FIG. 8** described below.

An ion chamber lens 164 having nine photo-etched openings 166, with a diameter slightly greater than the diameter of the openings 162 of the entrance lens 160, is then positioned immediately above, while avoiding contact with, the entrance lens 160. The ion chamber lens 164 is positioned so that the openings 166 in the ion chamber lens 164 are centered over the openings 162 in the entrance lens 160. The ion chamber lens 164 is secured into position by spot welding two of three tabs to the support members **116*b* and 116*a*. Further, the third tab is spot welded to the pin 120*h* to provide an electrical connection for this lens to the electrical circuit of FIG. 8 as described below. The ion chamber lens 164** is preferably fabricated from thin stainless steel, e.g., 0.002 inches thick and is preferably in the shape of a hexagon.

An ion chamber 170, having an upper surface 171, six faces 172 and six flanges 173, as well as a multiple of photo-etched openings 174 in both the upper surface 171 and the faces 172, is then mounted on top of the ion chamber lens 164. The ion chamber 170 is secured in this position by spot welding the six flanges 173 to the upper surface of the ion chamber lens 164 such that the flanges 172 are flush with the six edges of the hexagonal ion chamber lens 164 (FIG. 1). The ion chamber 170 is also formed from the same thin metal stock as the ion chamber lens 164, and it is formed by bending the metal to obtain an open ended hexahedron with the six flanges 173 attached to the faces 172 of the ion chamber 170 adjacent to the open end. The openings 174 are photo-etched into the ion chamber 172 in a well known manner, and they permit gas molecules to enter the ion chamber 170 to be ionized, in the manner described in reference to FIG. 7 below.

A filament coil 176 formed from a suitable filament material, such as tungsten or iridium, by conventional filament winding techniques, is then spot welded to two filament supports **180*a* and 180*b* which are respectively spot welded in turn to the pins 120*k* and 120*i*. The filament coil 176 is preferably positioned immediately adjacent to one of the openings 174 in the ion chamber 170 with the filament coil 176 parallel to a flange 173 and a respective face 172 of the ion chamber 170. A concave metal reflector shield 182 is then mounted on the mechanical support 116*e*, such that the filament coil 176 is shielded by the concave metal reflector shield 182**. As discussed below, the filament provides a source of electrons to ionize gas molecules for detection by the sensor. Other ion sources may also be used in alternative embodiments. In addition, the gas sensor may be used to detect naturally occurring gas ions.

A two-piece metal protective cover 184 for the sensor 100 is then formed from a suitable metal material. The cover 184 is constructed from a first member 186 and a second member 188. The first member 186, shown in FIG. 1, includes an upper surface 190 in the shape of an octagon having a plurality of openings 192. Four side members 194 (two shown in FIG. 1) extend perpendicularly downwards from alternating edges of the upper surface 190 and are respectively bent at the end opposite the upper surface 190 into four flanges 196.

The second member 188, also shown in FIG. 1, comprises eight sides 202 forming an octagonal tube 196 with inside dimensions substantially the same as the outside dimensions of the first member 186. At least one, and preferably four sides 202 has a plurality of openings 204. The second member 188 is mounted over the first member 186 and is then spot welded to the first member 186 to form the complete protective cover 184 shown in FIG. 2. The protective cover 184 is then mounted on the sensor 100 by spot welding the flanges 196 to the upper surface of the base casing 104. The protective cower 184 is preferably dimensioned so that the flanges 196 flushly mount on the casing 104, and that when the protective cover 184 is so mounted, it encloses, but does not touch, the above described components of the sensor 100.

FIG. 2 illustrates the components of the assembled sensor 100 prior to the positioning of the protective cover 184 onto the base casing 104. FIG. 2 further illustrates the relative positions of the components, shown in greater detail in FIG. 1, after the sensor 100 has been assembled. The sensor 100 shown in FIG. 2 is preferably $\frac{5}{8}$ inch in diameter and approximately $1\frac{1}{2}$ inch in length. Consequently, the amount of volume of a low pressure chamber occupied by the sensor 100 is minimized as compared to the quadrupole residual gas sensors of the prior art. Further, since the sensor 100 uses an array of quadrupoles 112, the sensitivity of the sensor 100 is multiplied.

FIG. 3 illustrates the upper surface of the base 102 of the sensor 100 showing the relative positions on the rods 110, the support members 116, and the pins 120 as they project out of the base 102. As shown, the array 108 of sixteen rods 110, forming nine square quadrupoles elements 112, is centered in the glass seal 106 and is surrounded by the support members 116 and the pins 120. FIG. 4 illustrates the bottom surface of the base 102 of the sensor 100. As shown, only the pins 120 extend completely through the glass seal 106. Further, the pin **120*a*, which is connected to the collector 140, is concentrically enclosed within the shielding tube 146 where the pin 120*a* is embedded in the glass seal 106. The shielding tube 146 protects the pin 120*a* from electrical noise generated by the voltages applied to the other pins 120**.

Figure 5:
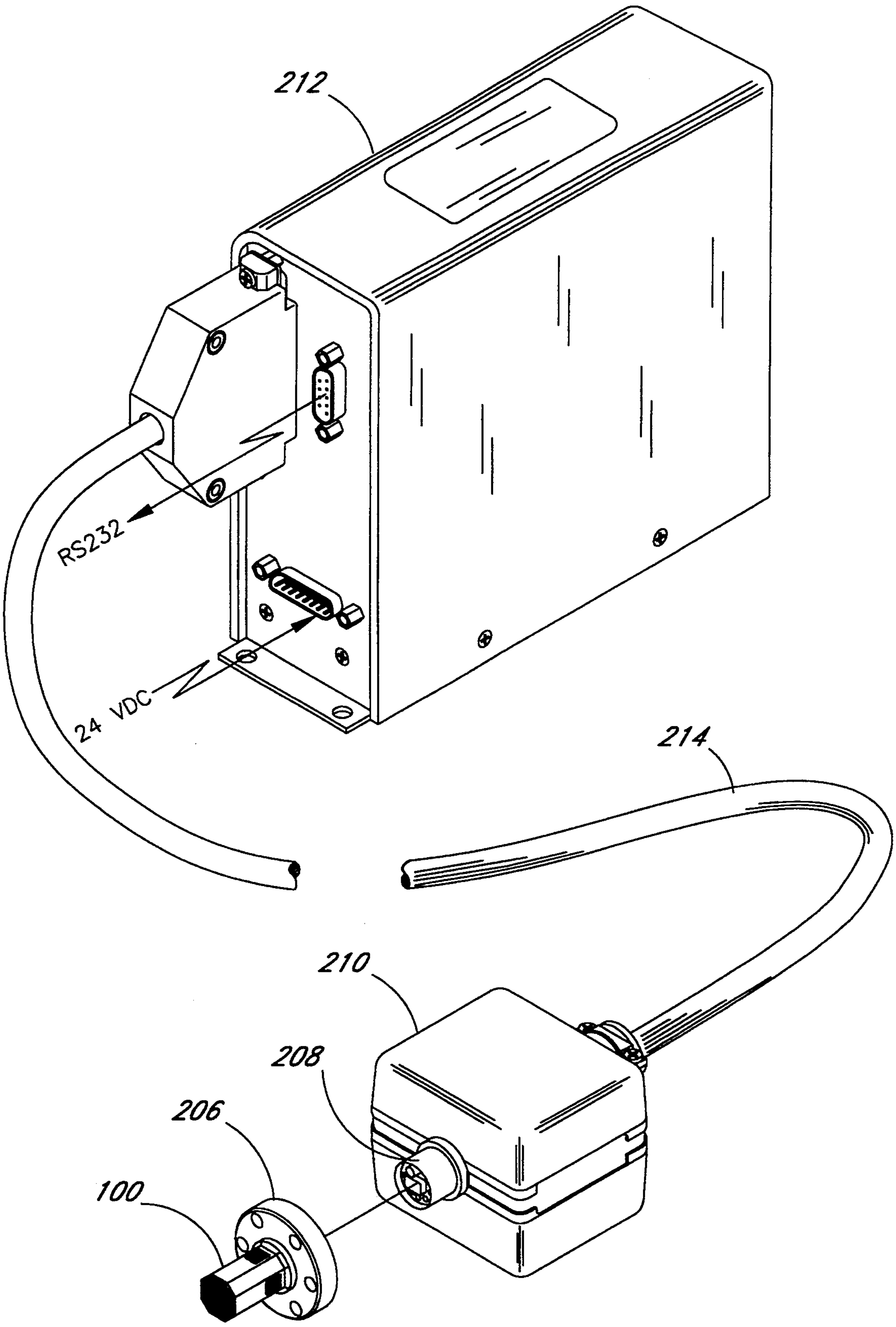
FIG. 5 is a perspective view illustrating the residual gas sensor shown in FIGS. 1 and 2 with an accompanying external network of components used to drive the sensor.

FIG. 5 illustrates the typical manner in which the sensor 100 is connected to the external components controlling the operation of the sensor 100 when it is mounted in a low pressure chamber. The sensor 100 is preferably securely positioned within a flanged mounting collar 206. The mounting collar 206 permits the sensor 100 to be mounted through the wall of a low pressure chamber (not shown) with the cantilevered end of the sensor 100 positioned within the chamber and the base 102 positioned outside of the chamber, while still maintaining the low pressure sealing integrity of the chamber. Note, in this embodiment, any method of mounting the sensor 100 within the chamber while still permitting access to the pins 120 (FIG. 4) and maintaining the low pressure integrity of the chamber can be used.

The sensor 100 is then plugged into a female receptacle 208, having dimensions and connections corresponding to the dimensions and arrangement of the pins 120 of the sensor 100 shown in FIG. 4. The female receptacle 208 is mounted on, and provides electrical connection to, a spectra converter 210. The spectra converter 210 converts the signals generated by the sensor 100 into signals that can be processed to determine which gases exist in the low pressure chamber. The spectra converter 210 is specifically configured to generate signals indicating the presence of ions having an Atomic Mass Unit (AMU) within a given range, e.g., 2–60 AMUs, in the low pressure chamber. The spectra converter 210 is then interactively connected to a Computer Interface Module 212 via a multiple wire cable 214.

The Computer Interface Module 212 is then slaved to a host computer (not shown). The Computer Interface Module 212 preferably includes circuitry capable of providing the appropriate voltages to the rods 110 and the pins 120 for detecting the presence of gas molecules having a specific Atomic Mass Unit (AMU) within the pre-selected range of Atomic Mass Units of the spectra converter 210. The user can then control the operation of the sensor 100 via the host computer, which signals the Computer Interface Module 212 to scan for ions having an AMU within the pre-selected range, by applying appropriate voltages to the rods 110 and the pins 120. The generation and application of these voltages is described more fully in reference to FIGS. 6, 7 and 8 below.

Further, the computer interface module 212 scans the varying output of the spectra converter 210 resulting from the application of varying voltages to the rods 110 and the pins 120 and determines if the output of the spectra converter 210 is indicative of the presence of a specific gas molecule within the low pressure chamber. If the output of the spectra converter 210 indicates the presence of gas molecules having a particular AMU, the computer interface module 212 includes firmware permitting it to analyze the voltages applied to the sensor 100 and the output of the spectra converter 210 to ascertain what gas molecules are present in the chamber and in what quantities. As can be appreciated, the sensors 100 can be installed in multiple low pressure or vacuum chambers and networked together to permit a single central host computer to scan for ions within multiple low pressure chambers by utilizing well known networking interfaces and protocols.

Figure 6:
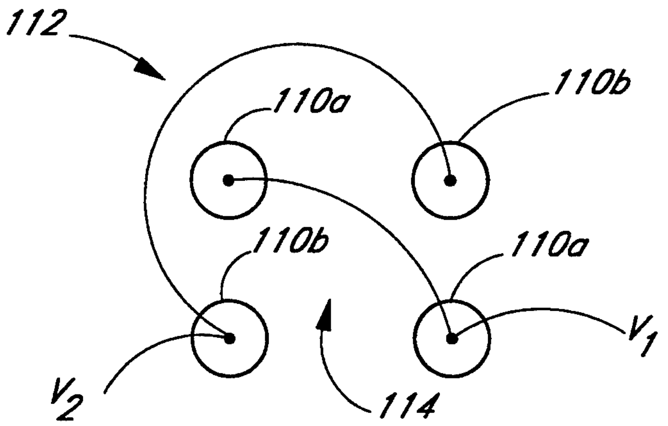
FIG. 6 is a schematic illustrating the electrical connections to the rods of a single quadrupole element of the sensor of FIGS. 1 and 2.

FIG. 6 is a schematic diagram of a single quadrupole array element 112 comprising four rods 110 illustrating the voltages applied to the rods 110 of a single representative quadrupole element 112 when the sensor 100 is scanning for the presence of gas molecules having a particular Atomic Mass Unit. As previously described in reference to FIGS. 1 and 2, the positive bus 122 and the negative bus 124 are each respectively connected to eight of the sixteen rods 110 so that, in any single quadrupole array element 112 the same voltage is applied to the rods 110 mounted diagonally from one another. Hence, as shown in FIG. 6, the upper left hand rod 110 and the lower right hand rod 110 i.e., the positive rods **110*a*, are both connected to the positive bus 122 (FIGS. 1 and 2) which applies a first voltage ($V_1$) to these rods, and the upper right hand rod 110 and the lower left hand rod 110, i.e., the negative rods 110*b*, are connected to the negative bus 124 (FIGS. 1 and 2**) which applies a second voltage ($V_2$) to these rods.

The first and second voltages have both an AC component and a DC component. The DC component of both these voltages, when applied to the four rods 110 preferably result in a constant DC voltage potential of, for example, 55 volts DC at the center of the channel 114. The AC components of the first and second voltages preferably have the same amplitude and frequency, however, these voltages have 180° phase difference from each other. Hence, at any one time, the sum of the AC components of the first voltage and the second voltage preferably equals zero. Further, the AC and DC voltages are selected so that the peak-to-peak value of the AC component is approximately six times the value of the DC component. The AC and DC components can be respectively varied so long as 55 volts DC is still maintained in the center of the channel 114, and the AC voltage is still preferably six times the DC component. The generation of these voltages is described in reference to FIG. 8 below.

The voltages applied to the rods 110 in the quadrupole array element 112 generate an electric field within the channel 114. The strength of the electric field varies in response to variations in the voltages $V_1$ and $V_2$ applied to the rods 110. Hence, by varying the voltages applied to the positive rods **110*a* and the negative rods 110*b*, each of the nine quadrupole element 112 of the sensor 100 can be simultaneously tuned to generate an identical electric field within each of the nine channels 114 of the sensor 100. The operation of the sensor 100 is more fully described in reference to FIG. 7** below.

Figure 7:
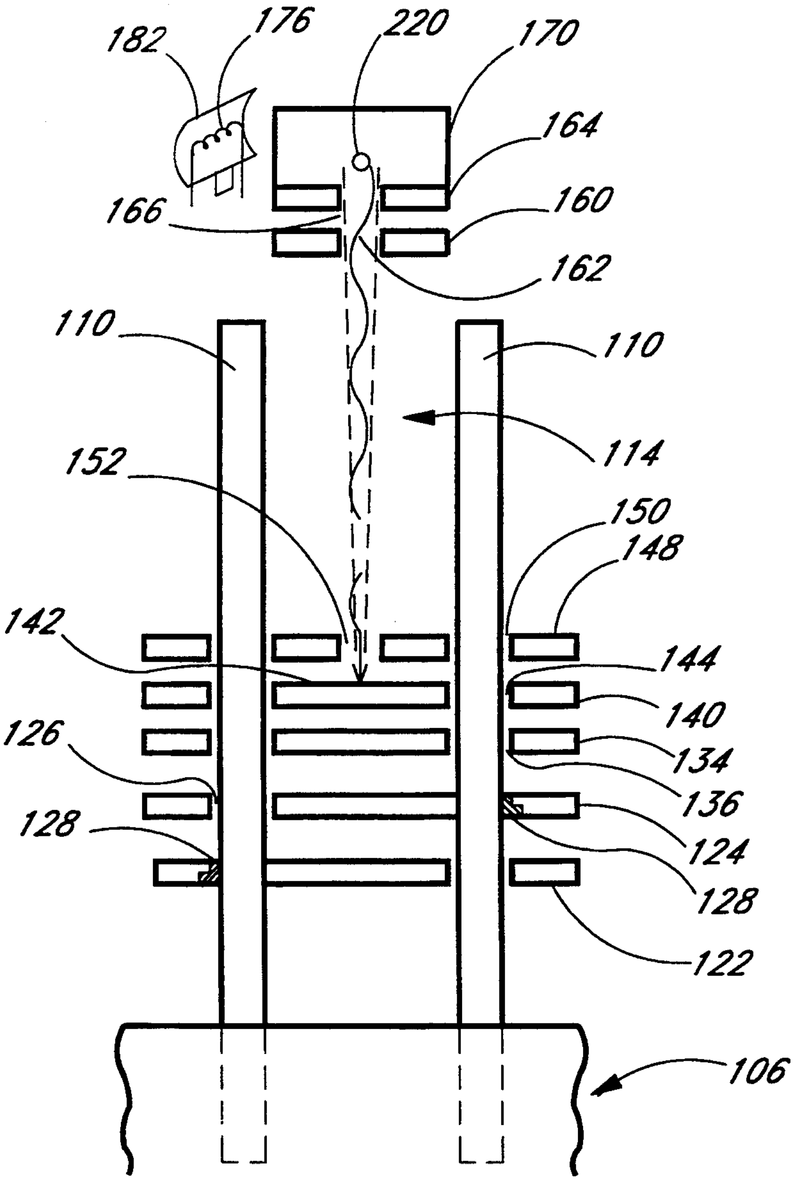
FIG. 7 is a side view schematic illustration of a single quadruple element of the residual gas sensor shown in FIGS. 1 and 2.

FIG. 7 is a side view schematic diagram of a single quadrupole array element 112 which is used to illustrate the operation of an array element 112 when the sensor 100 is mounted in a low pressure chamber (not shown) and tuned to detect an ion 220 having a specific AMU and mass-to-charge ratio. The operation described below is typical of the operation of each of the quadrupole elements 112 of the sensor 100.

Figure 1A:
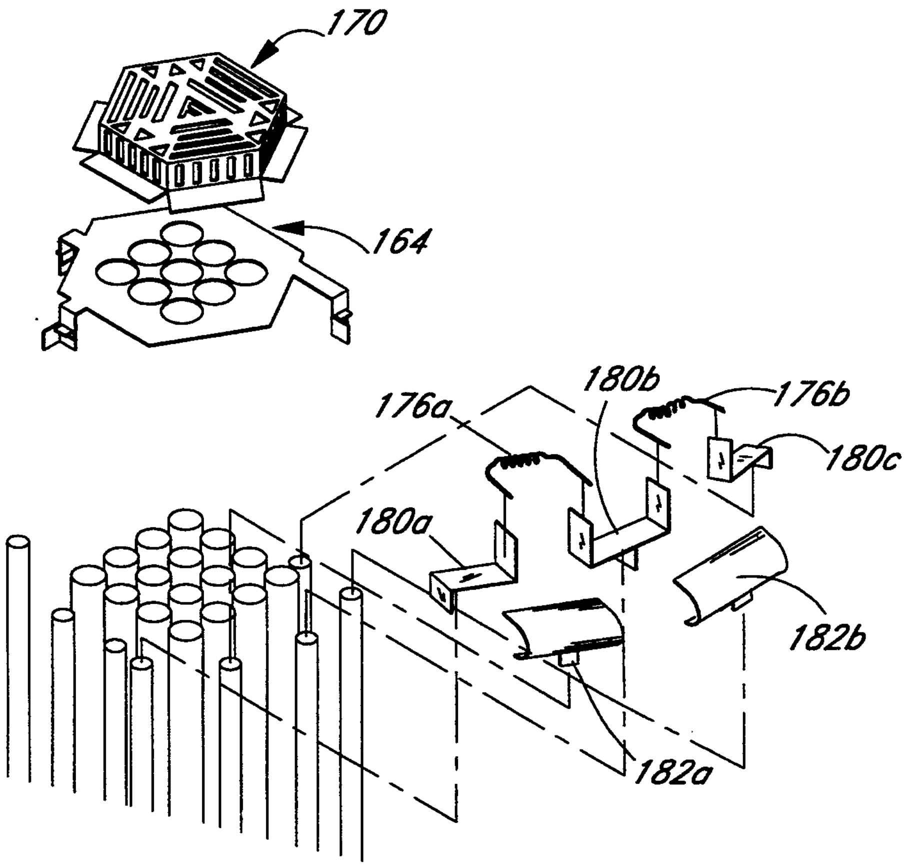
FIG. 1*a* is a partial perspective view of the gas sensor of FIG. 1, illustrating an alternative embodiment having two filaments for supplying electrons.

Differing voltages are initially applied to both the pins **120*k* and 120*i* (not shown in FIG. 7), thereby creating a voltage potential between filament supports 180*a* and 180*b* resulting in a current flow in the filament 176 (FIGS. 1 and 2). The current flow in the filament 176 causes electrons to be released which are then free to travel within the low pressure chamber. The shield 182 partially blocks electron flow in directions other than toward the ion chamber 170. Note, in an alternative embodiment of the sensor 100, two filaments 176*a* and 176*b* are mounted on the sensor 100, as illustrated in FIG. 1*a*. If the first filament 176*a* burns out, then similar differing voltages are applied to pins connected to the second filament 176*b*, to cause the second filament 176*b*** to emit electrons in a similar fashion. Advantageously, only three pins are needed for this alterative embodiment, as one pin provides a common connection for the two filaments.

A voltage of 65 volts DC is also preferably applied to the pin **120*h*. Since the ion chamber 170 and the ion chamber lens 164 are both spot welded to the pin 120*h* (FIGS. 1, 2 and 3), both the ion chamber 170 and the ion chamber lens 164 are then energized to 65 volts DC. This voltage causes some the electrons generated by the filament 176 mounted immediately adjacent to the ion chamber 170 to be accelerated towards the ion chamber 170. Some of these accelerated electrons pass into the inside of the ion chamber 170 through the openings 174 (FIGS. 1 and 2) in the face 172 of the ion chamber 170 immediately adjacent to the filament 176**.

The openings 174 in the ion chamber 170 also permit gas molecules to permeate the space inside the ion chamber 170. It is a well-known phenomenon that gas molecules distribute themselves throughout an enclosed volume to equal densities. The protective cover 184 (FIGS. 1 and 2) includes the plurality of openings 192 and 204 which permit the gas molecules to enter the sensor 100. Thus, inside the ion chamber 170, gas molecules are present in proportion to the density of gas elsewhere in the low pressure chamber. Some of the electrons accelerated into the ion chamber 170 by the 65-volt DC potential collide with the gas molecules inside the ion chamber 170. These collisions positively ionize the gas molecules by stripping electrons away. Consequently, a uniform portion of the gas molecules present in the low pressure chamber are then ionized in the ion chamber 170.

A voltage of 55 volts DC is also applied to the pin **120*b* resulting in a 55-volt DC potential appearing on the entrance lens 160 mounted underneath, and immediately adjacent to, the ion chamber lens 164. The 55-volt DC potential on the entrance lens 160 has the effect of drawing a representative portion of the positively charged ions 220 out of the ion chamber 170 through the openings 166 in the ion chamber lens 164**.

Further, a representative portion of the ions 220 drawn out of the ion chamber 170 through the opening 166 in the ion chamber lens 164 are also drawn through the opening 162 in the entrance lens 160 into the channel 114. As described above in reference to FIGS. 1 and 2, the openings 162 in the entrance lens 160 and the openings 166 in the ion chamber lens 164 are each centered on the channel 114. The DC voltage at the center of the channel 114 is also preferably maintained at 55 volts. Hence, a portion of the ions 220 generated in the ion chamber 170 are drawn into the channel 114 of the quadrupole element 112. The ions 220 drawn into the channel 114 consequently represent a uniform portion of gas molecules present in the low pressure chamber.

As previously described in reference to FIG. 6, the sum of the average of the DC voltages applied to the rods 110 at the center point of the channel 114 equals 55 volts DC, and the sum of the AC voltages applied to the rods effectively equals zero as the AC voltages preferably have the same amplitude and frequency but are 180° out of phase from each other. The collector 140 of the sensor 100 has an effective voltage potential of zero. Consequently, the ions 220 are attracted toward the collector 140 mounted down the channel 114. However, the AC components of the voltage applied to the positive rods **110*a* and the negative rods 110*b* (FIG. 6) generate an oscillating electric field within the channel 114 thereby inducing oscillatory motion on the ions 220, relative to the center of the channel 114, as they travel towards the collector 140**.

The degree to which each ion 220 oscillates away from the center of the channel 114 depends upon the strength of the oscillating electric field, the DC potential and the mass-to-charge ratio of the ion. The mass-to-charge ratio of the ion 220 is dependent upon the Atomic Mass Unit of the gas molecule from which the ion was created. Further, the strength of the oscillating electric field is dependent upon the voltages that are applied to the rods **110*a* and 110*b* comprising the quadrupole element 112. As can be appreciated, the oscillating electric field can be tuned such that only those ions having a specific mass-to-charge ratio are capable of travelling in the center of the channel 114 from the entrance lens 140 to the upper shield lens 148. The oscillatory motion of an ion 220 not having the tuned mass-to-charge ratio as it travels down the channel 114 in the direction of the collector 140, tends to have an increasingly greater amplitude until the ion 220 is pulled to one of rods 110 and neutralized. In contrast, the oscillatory motion of an ion 220 with the tuned mass-to-charge ratio as it travels down the channel 114 in the direction of the collector 140, tends to remain relatively constant, permitting the ion 220 to travel substantially in the center of the channel 114 as is illustrated in FIG. 7**.

Further, for an ion 220 to actually reach the surface 142 of the collector 140, the ion 220 must be able to pass through the opening 152 in the upper shield lens 148 mounted adjacent to and immediately above the collector 140. The opening 152 in the upper shield lens 148 is positioned such that it is in the center of the channel 114 and is dimensioned to only permit the ions 220 having the tuned mass-to-charge ratio, and thus traveling in the centers of the channels 114, to pass through. Hence, the radius of the opening 152 is slightly greater than the maximum distance the tuned ion 220 oscillates away from the center of the channel 114. Consequently, the opening 152 further permits the voltages on the rods 110 to be tuned to allow only ions having a specific charge to mass ratio to actually reach the surface 142 of the collector 140.

The tuned ions 220 reaching the collector surface 142 generate a small electrical current on the collector 140. Since the pin **120*a* is spot welded to the collector 140, this current can be detected by the spectra converter 210 (FIG. 5) connected to the sensor 100 and the pin 120*a* via the receptacle 208. The sensor 100 and the external circuitry of FIG. 5 is then calibrated such that when voltages, known to tune the sensor 100 for ions having a specific AMU and mass-to-charge ratio, are applied to the rods 110, and a current is detected on the pin 120*a*, the external circuitry of FIG. 5 indicates the presence of the gas molecule corresponding to this ion 220** in the low pressure chamber.

In this preferred embodiment, the external circuitry connected to the sensor 100 (FIG. 5) is programmed to tune the voltages on the positive and negative rods **110*a* and 110*b* respectively for each of the quadrupole elements 112 so that the sensor 100 as a whole is tuned for a particular ion having a specific AMU and mass-to-charge ratio. Further, the external circuitry shown in FIG. 5 also preferably sequentially tunes the sensor 100 for each ion having an AMU within a selected range, e.g., 1–60 AMUs, and determines which ions within this range are present. In this fashion, the sensor 100** can be used to detect the presence of one or a number of possible gas molecules in the low pressure chamber.

The number of ions of a particular mass-to-charge ratio striking the collector 140 when the voltages on the rods 110 are appropriately tuned, is directly proportional to the number of gas molecules with the corresponding AMU within the low pressure chamber. Thus, the current, on the pin **120*a* resulting from the tuned ions impacting upon the surface 142 of the collector 140, is also proportional to the number of gas molecules of the selected AMU within the low pressure chamber. Consequently, by appropriately calibrating the external electronics connected to the sensor 100, the user of the sensor 100** can determine not only what gases are present in the low pressure chamber, but also how much of these gases are present.

Finally, as shown in FIGS. 1 and 2 above, the ion chamber lens 164, the entrance lens 160 and the upper shield 148 each has openings 166, 162, and 152, respectively, and the collector 140 includes a surface 142 for each of the channels 114 of the nine quadrupole elements 112 comprising the nine element quadrupole array of the sensor 100. Further, the positive rods **110*a*** and the negative rods **110*b* for each of the nine quadrupole elements 112 in the sensor 100 are simultaneously energized by the busses 122 and 124 (FIGS. 1 and 2) respectively to the same voltages. Hence, each of the nine quadrupole elements 112 of the sensor 100 simultaneously receive ions from the ion chamber 170 and are charged to the same voltages. Consequently, when this preferred embodiment of the sensor 100 is operating, each of the nine elements is tuned for the same ion at any one time. This results in increased sensitivity for the sensor 100 as the output current on pin 120*a*, reflecting the number of tuned ions impacting on the collector surfaces 142, is nine times as large as the current received by a single quadrupole under similar conditions, Further, the increase in sensitivity of the sensor 100 is achieved without increasing the length of the channel 114 that the tuned ions 220 must travel to make contact with the collector surface 142. Specifically, in one preferred embodiment of the sensor 100, the distance the tuned ions must travel is on the order of ¼ inch. Hence, the sensor 100 can operate at higher pressures with the distance the ions 220 have to travel being less than the mean free path of the ions 220. Consequently, the sensor 100 can operate at higher pressures, e.g., $1.5\times10^{-2}$ Torr without suffering from substantial decline in sensitivity resulting from the tuned ions 220 colliding with other gas molecules within the channel 114. The ability of the sensor 100** to operate at these pressures minimizes the need for sampling the contents of the low pressure chamber and the equipment necessary to perform such sampling.

Figure 8:
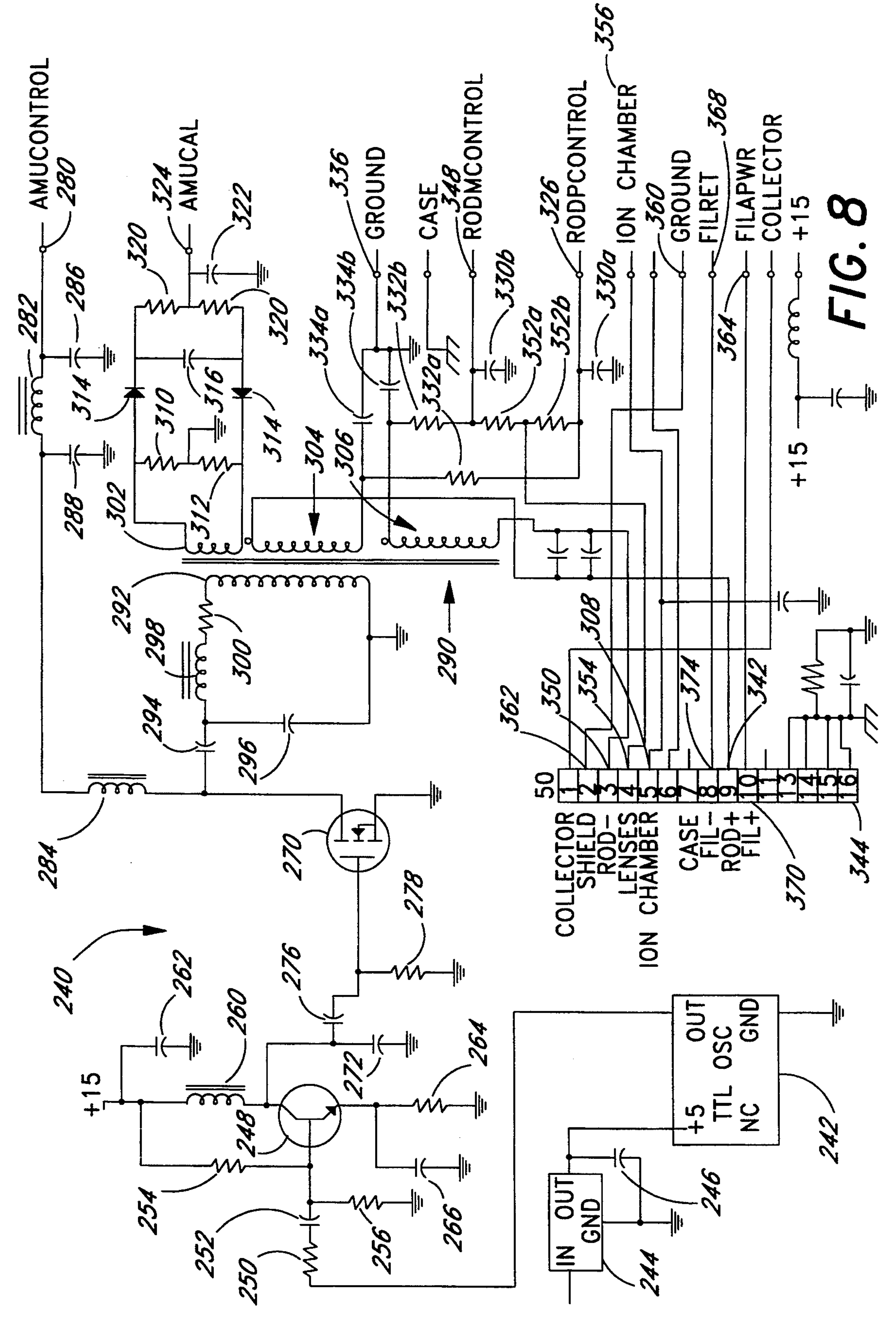
FIG. 8 is a schematic illustrating the electrical circuit providing the voltages to the residual gas sensor shown in FIGS. 1 and 2.

FIG. 8 illustrates an electrical circuit comprising a driver circuit 240 which provides the above-described voltages to the components of the sensor 100. The driver circuit 240 generates the appropriate voltages in response to signals received from the host computer and the computer interface module 212. The driver circuit 240 includes a TTL oscillator 242 receiving a five-volt input voltage from a solid state DC power supply 244 and a capacitor 246. The output of the oscillator 242 drives a bipolar transistor 248 through a resistor 250, a coupling capacitor 252 and two biasing resistors 254 and 256. The collector of the transistor 248 is connected to a 15-volt DC power supply via a choke 260 and a filtering capacitor 262. The emitter of the transistor 248 is connected to ground through a resistor 264 in parallel with a capacitor 266. The output of the transistor 248, taken at the collector, then drives a switching transistor 270 through a biasing capacitor 272, and a filtering network consisting of coupling capacitor 276 and a resistor 278.

The signal from the oscillator 242 is thus amplified by the transistor 248 and used to turn the switching transistor 270 on and off. The switching transistor 270 is preferably a power MOSFET transistor capable of handling large currents. An AMUCONTROL input 280 provides a DC voltage, generated in response to signals sent from the host computer, to the drain of the switching transistor 270 through two protective chokes 282 and 284, respectively, and two filtering capacitors 286 and 288. Hence, the amplified oscillating signal from the transistor 248 turns the DC AMUCONTROL voltage into an AC voltage with an amplitude proportional to the DC voltage applied to the AMUCONTROL input 280 and a frequency equal to the frequency of the amplified oscillating signal applied to the base of the switching transistor 270.

The oscillating voltage signal on the drain of the switching transistor 270 is then applied to the primary winding 292 of a step up transformer 290 through an AC filtering circuit comprising a coupling capacitor 294, a biasing capacitor 296, a choke 298 and a resistor 300. The AC filtering circuit ensures that an AC voltage with a sinusoidal waveform, having a frequency equal to the frequency of the output of the oscillator 242 and a peak-to-peak amplitude proportional to the DC voltage applied to the AMUCONTROL input 280, is applied to the primary winding 292 of the transformer 290.

The transformer 290 has three secondary windings 302, 304, and 306. The turns ratio of the transformer 290 is selected to permit AC voltages to be supplied to the rods 110 of the sensor 100 having a peak-to-peak amplitude selected to be approximately six times the magnitude of the DC voltages that are also applied to the rods 110 of the sensor 100.

The first secondary winding 302 of the transformer 290 supplies an AC voltage to a calibration circuit comprising two resistors 310, 312 coupled between the outputs of the secondary winding and ground, a pair of diodes 314, a capacitor 316 and a pair of resistors 320. The output of the calibration circuit is then supplied to an AMUCAL terminal 324 through a capacitor 322. The voltage on the AMUCAL terminal 324 can then be compared to the voltage supplied to the AMUCONTROL terminal 280 to ensure that the AC voltage appearing on the secondary windings 302,304 and 306 of the transformer 290 is appropriately calibrated.

The second secondary winding 304 of the transformer 290 supplies a DC biased AC voltage to the positive rods **110*a* (FIG. 6) of each of the nine quadrupole element 112 in this presently preferred embodiment of the sensor 100, i.e., the rods 110 connected by the positive bus 122. The lower leg of the secondary winding 304 receives a DC biasing voltage from a RODPCONTROL input 326 through a filtering capacitor 330*a* and a resistor 332*a*. The DC biasing voltage is maintained at the DC voltage applied to terminal 326 relative to ground by a capacitor 334*a* connected to a GROUND terminal 336. The upper leg of the secondary winding 304 is then connected to a ROD+ output terminal 342 in a sixteen output terminal block 344. The output terminal 342 is then connected to the female receptacle 208 (FIG. 5) so that the voltage on the output terminal 342 is supplied to the pin 120*g* (FIG. 3) thereby energizing the positive rods 110*a* (FIG. 6**).

The third secondary winding 306 of the transformer 290 supplies a DC biased AC voltage to the negative rods **110*b* (FIG. 6) of each quadrupole element 112, i.e., the rods 110 connected by the negative bus 124. The upper leg of the third secondary winding 306 receives a DC biasing voltage from a RODMCONTROL input 348 through a capacitor 330*b* and a biasing resistor 332*b*. The DC biasing voltage is maintained at the DC voltage applied to terminal 348 relative to ground by a capacitor 334*b* which is also connected to the GROUND terminal 336. The lower leg of the secondary winding 306 is then connected to a ROD− output terminal 350 in the terminal block 344. The output terminal 350 is then connected to the female receptacle 208 (FIG. 5) so that the voltage on the output terminal 350 is supplied to the pin 120*c* thereby energizing the negative bus 124 (FIGS. 1 and 2) and the negative rods 110*b* (FIG. 6**).

The secondary windings 304 and 306 are identical in all respects except that the reference directions of the two windings are reversed. Hence, the waveforms originating out of the secondary windings 304 and 306 preferably have identical amplitudes and frequency, however they are 180° out of phase. Further, the capacitors 334*a*, and 334*b* are identical to each other as are the resistors 332*a*, 332*b*, and the capacitors 330*a*, 330*b*. Consequently, the AC component of the voltages applied to the pins 120*g* and 120*c* from output terminals 342 and 350 are preferably sinusoidal waveforms having the same amplitude and frequency, but are 180° out of phase from each other.

The peak-to-peak amplitude of the AC components of the voltages applied to pins 120*g* and 120*c* is substantially equal to the DC voltage applied to the AMUCONTROL terminal 280 times the turns ratio of the step up transformer 290. The frequency of the AC component of the voltages applied to the pins 120*g* and 120*c* is substantially equal to the frequency of the oscillator 242. In this presently preferred embodiment of the sensor 100, the oscillator 242 and the component values of the capacitors, chokes, and resistors comprising the circuit 240 can be selected to permit frequencies of approximately 7, 11 and 13 MHz respectively. The frequency selected determines the range of AMU for which the sensor 100 can detect the presence of gas molecules in the low pressure chamber.

The DC biasing voltages applied to the RODPCONTROL terminal 326 and the RODMCONTROL terminal 348 are selected so as to maintain a 55-volt DC potential in the center of the channel 114 as described above. These voltages are generated and supplied by a variable DC power supply (not shown) which is an integral component of the computer interface module 212.

The amplitude of the AC voltages applied to the rods 110 of each of the quadrupole elements 112 can be varied by changing the input DC voltage on the AMUCONTROL input terminal 280. Further, the DC voltages applied to either the positive rods 110*a* or the negative rods 110*b* can also be varied by changing the input DC voltages on the RODPCONTROL input terminal 326 and the RODMCONTROL input terminal 348. Thus, by varying the DC input voltages supplied to the terminals 280, 326, and 348, each of the quadrupole elements 112 can be tuned for an ion having a particular AMU and mass-to-charge ratio.

The driver circuit 240 also includes a voltage divider network between the RODPCONTROL terminal 326 and the RODMCONTROL terminal 348 comprising resistors 352*a* and 352*b*. The output of the voltage divider network is then connected to a LENSES output terminal 354 on the terminal block 344. The output terminal 354 is then connected to the female receptacle 208 (FIG. 5) so that the voltage on the output terminal 354 is supplied to the pin 120*b*, thereby supplying this voltage to the entrance lens 160 and the upper shield 148 (FIG. 4). Preferably, the resistors 352*a* and 352*b* have identical resistances selected so that the voltage divider network supplies 55 volts DC to the LENSES terminal 354 and consequently the entrance lens 160 and the upper shield 148.

The driver circuit 240 also receives a DC voltage on an ION CHAMBER input terminal 356. The DC voltage is preferably 65 volts DC, and it is supplied directly to an ION CHAMBER output terminal 358 on the terminal block 344. The ION CHAMBER output terminal 358 is then connected to the female plug receptacle 208 (FIG. 5) so that the 65 volts DC is supplied to the pin 120*h* thereby energizing the ion chamber 170 and the ion chamber lens 164 to 65 volts DC as described in reference to FIG. 7 above.

The driver circuit 240 also has a grounded input terminal 360 which is coupled to output terminal 362 on the terminal block 344. The grounded input terminal 360 provides an external ground reference for the sensor 100. Specifically, the output terminal 362 is connected to the female plus receptacle 208 (FIG. 5) so that the pin 120*l* is connected to ground. As described above, the pin 120*l* is coupled to the concentric shielding tube 146 surrounding the pin 120*a* thereby protecting the pin 120*a* that carries the current from the collector 140 from electromagnetic effects caused by the voltages on the other pins 120 in the glass seal 106.

The driver circuit 240 also receives DC input voltages to power the filament 176 on input terminals 364 and 368. These voltages are supplied to output terminals 370 and 374 on the terminal block 344 respectively. The output terminals 370 and 374 are respectively connected to the female plug 208 (FIG. 5) so that they respectively provides voltages to the pins 120*k* and 120*i*. As described above in reference to FIG. 7, a DC voltage potential is created on the filament 176 between the pins 120*k* and 120*i* to thereby create electrons. In the alternative embodiment having two filaments as illustrated in FIG. 1*a*, when the first filament 176*a* burns out, a voltage potential is then applied to the second filament 176*b*.

As set forth above, the AMU range that can be measured by the gas sensor is determined in part by the magnitude and frequency of the voltage applied to the rods and the resulting field strength between the rods. The field strength is also determined by the distance between the rods. It has been determined that the AMU range is determined by these factors in accordance with the following equation:

$$M_m = \frac{7 \times 10^6 V_m}{f^2 r_0^2}$$

where $M_m$ is the maximum mass in AMU, Vm is peak AC voltage, f is the frequency, and $r_0$ is one-half the distance between diagonal rods in meters (i.e., $r_0$ is the radius of a circle inscribed within one quadrupole array). In the exemplary embodiment described herein, $r_0$ is 0.443 millimeters. A range of approximately 1–68 AMU is provided by a frequency of 13.5168 MHz and a peak voltage of 353.11 volts. A range of 1–100 AMU is provided by a frequency of 11.0592 MHz and a peak voltage of 347.62 volts. A range of 1–200 volts is provided by a frequency of 7.3728 MHz and a peak voltage of 308.99 volts.

As further discussed above, the length of the rods is partly determined by the expected pressure of the chamber in which the gas sensor is to be used. A lower gas pressure has less gas molecules and thus less collisions between gas molecules. Thus, longer rods can be used for more selectivity. In the exemplary embodiments described herein, rod lengths of 1 centimeter are advantageously used in gas sensors to be used in maximum pressures up to approximately 15 milliTorr. Rod lengths of 1.25 centimeters are advantageously used in gas sensors to be used in maximum pressures up to approximately 5 milliTorr. Rod lengths of 2 centimeters are advantageously used in gas sensors to be used in maximum pressures up to approximately 1 milliTorr.

Figure 9:
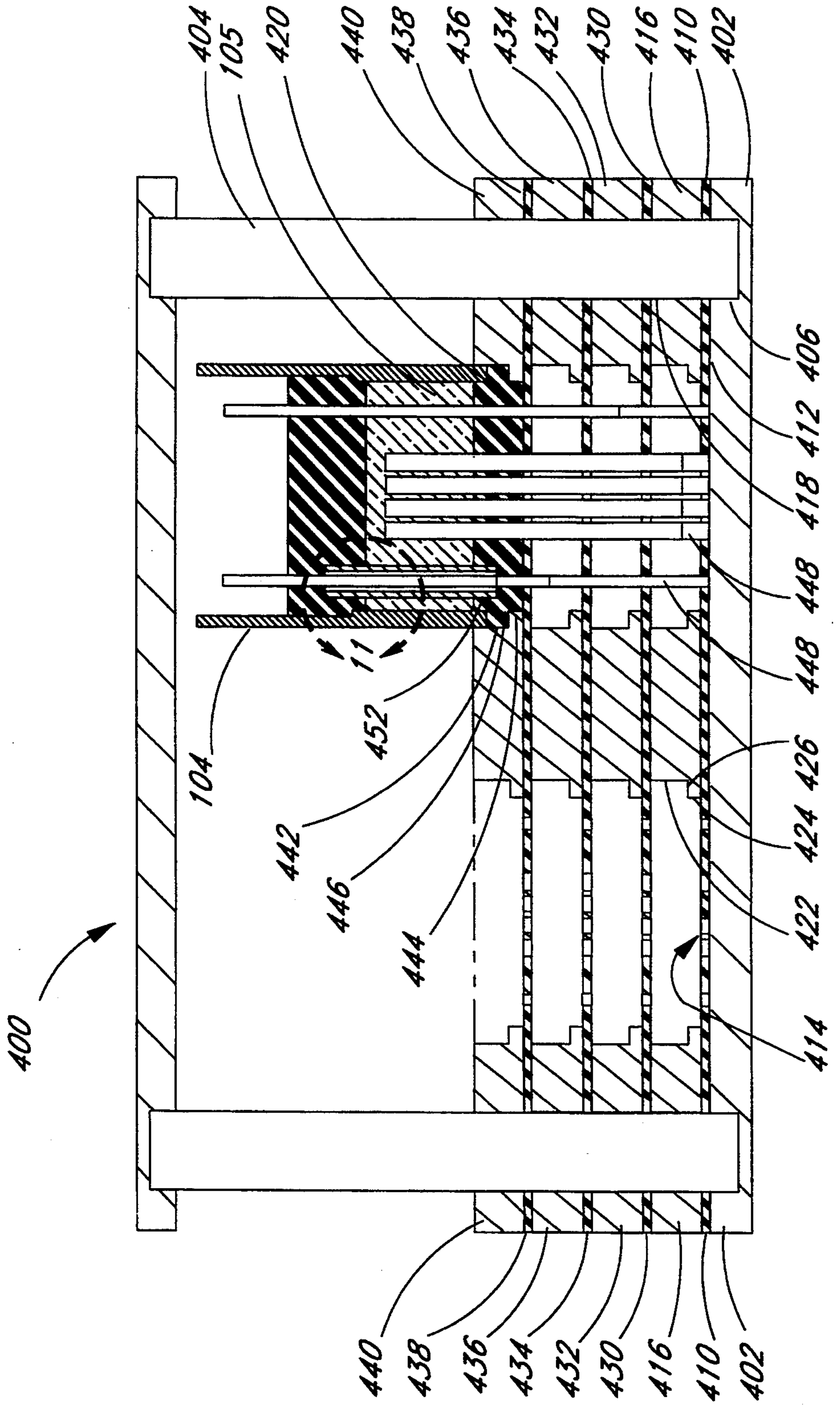
FIG. 9 is a side perspective view illustrating an oven tooling assembly for constructing the sensor of the present invention shown in FIGS. 1 and 2.
Figure 10A:
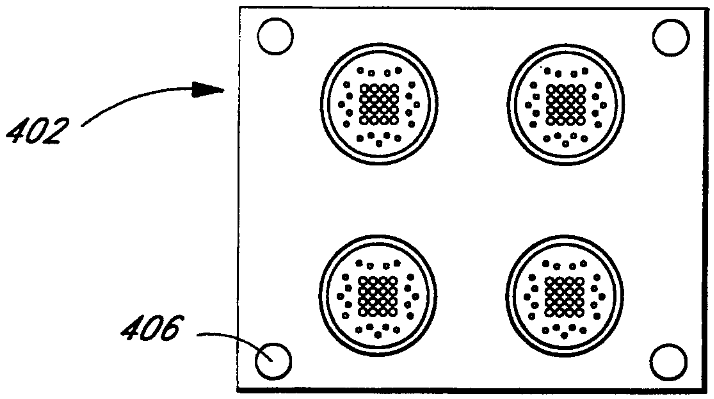
FIG. 10*a* is a top perspective view of a rectangular lower plate of the oven tooling assembly shown in FIG. 9 for constructing the sensor of the present invention.
Figure 10B:
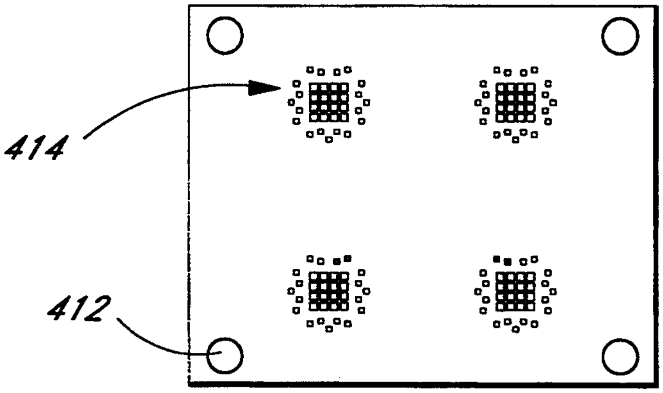
FIG. 10*b* is a top perspective view of a rectangular alignment plate of the oven tooling assembly shown in FIG. 9 for constructing the sensor of the present invention.
Figure 10C:
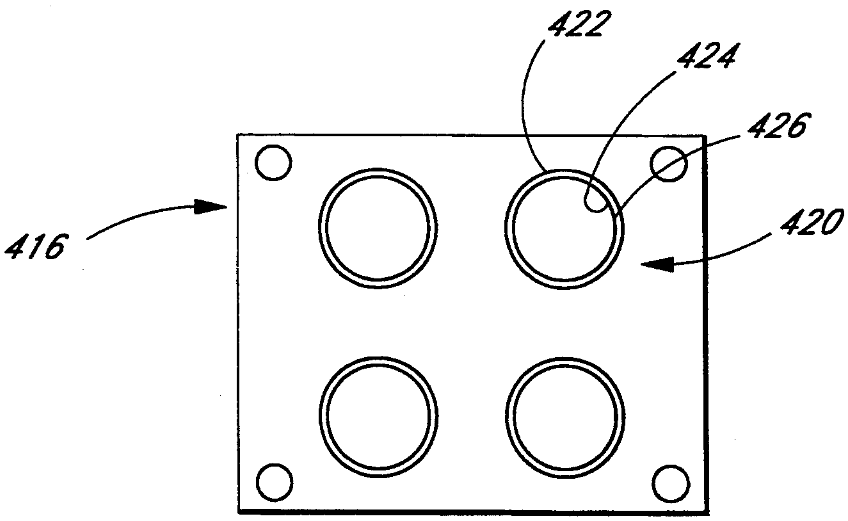
FIG. 10*c* is a top perspective view of a rectangular spacer plate of the oven tooling assembly shown in FIG. 9 for constructing the sensor of the present invention.
Figure 11:
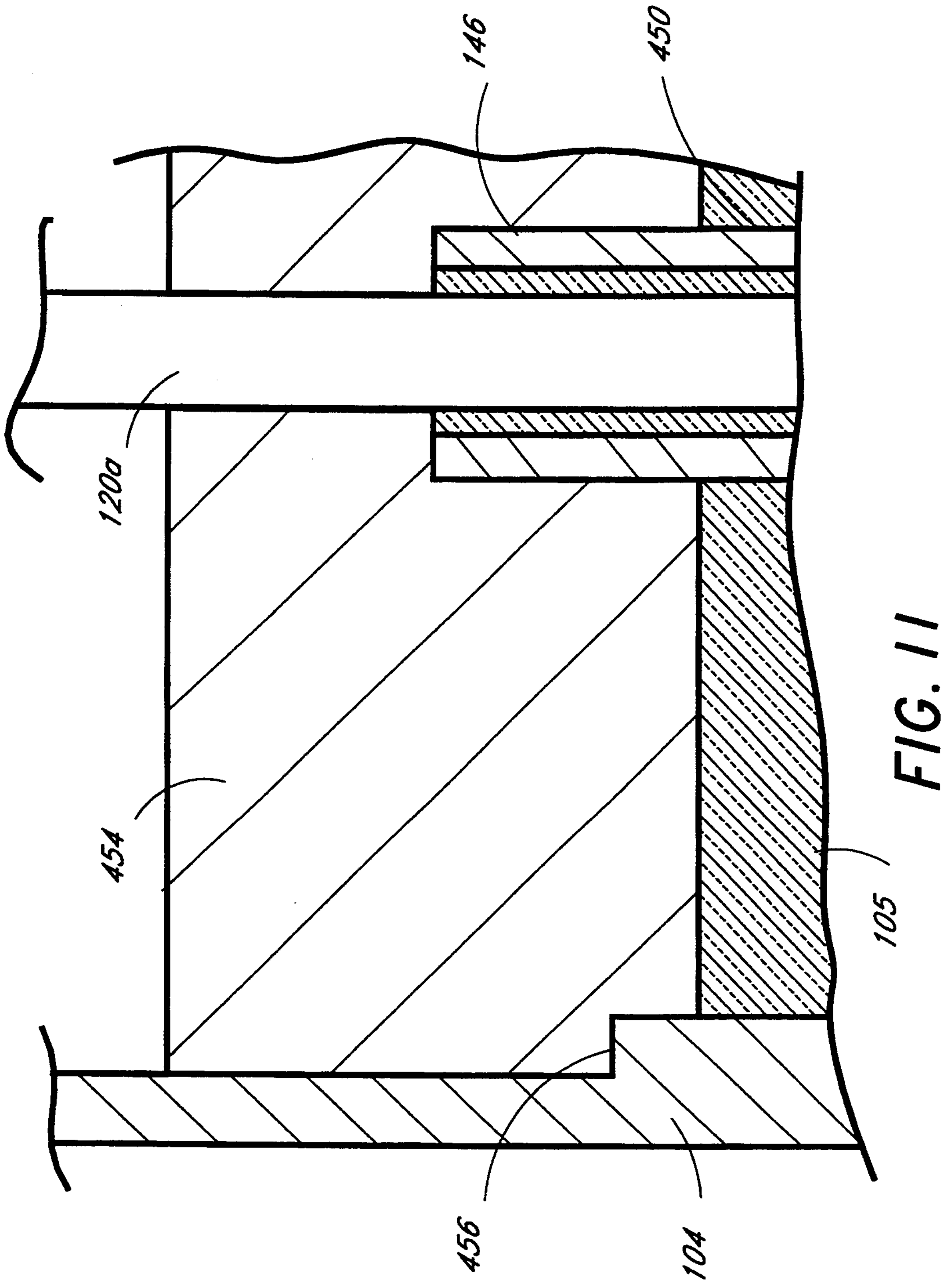
FIG. 11 is a detailed expanded view of the inset portion of the oven tooling assembly shown in FIG. 9 for constructing the sensor of the present invention.

FIGS. 9–11 illustrate an exemplary method and an exemplary apparatus for constructing the sensor 100 of the present invention. As illustrated in FIG. 9, an oven tooling assembly 400 is provided to support the glass bead 105, the rods 110, the support members 116, the pins 120 and the casing 104 (FIGS. 1 and 2) in a fixed predetermined relationship with each other as the glass bead 105 used to form the hardened glass seal 106 is heated in an oven (not shown) to cause the glass bead to reflow so as to form tightly around the rods 110, the support members 116, and the pins 120 and to expand and bind tightly with the inner surface of the base casing 104.

The oven tooling assembly 400 comprises a rectangular lower plate 402 which is disposed in a horizontal position. The lower plate 402 supports four vertical columns 404 which provide alignment for the remaining plates discussed below. As illustrated in the plan view in FIG. 10*a*, the lower plate includes four precision machined holes 406 proximate to each corner of the rectangle to hold the vertical columns 404 in a fixed position.

A first rectangular alignment plate 410 is positioned over the lower plate 402. As illustrated in the cross-sectional view in FIG. 10*b*, the first alignment plate 410 includes four holes 412 in the corners for engagement with the four vertical columns 404 for precise alignment. The first alignment plate 410 further includes a plurality of holes spaced in a pattern 414 corresponding to the pattern of the rods 110 in the gas sensor 100. In the illustrated embodiment, the hole pattern 414 is repeated four times so that four sensors 100 may be manufactured at one time. In the preferred embodiment, the first alignment plate 410 is made of Inconel having a thickness of approximately 0.004 inch (4 mils). The first alignment plate 410 is etched using printed circuit board techniques to provide precise positioning of the holes in the hole patterns.

A first rectangular spacer plate 416 is positioned over the first alignment plate 410. The first spacer plate 416 also includes four holes 418 in its four corners to engage the four vertical columns 404. The first spacer plate 416 also includes four large holes 420. Each large hole 420 has a diameter sufficiently large to encircle all the holes in one hole pattern 414 of the first alignment plate 410, and each large hole 420 is positioned in alignment with one hole pattern of the first alignment plate 410. For reasons discussed below, the first spacer plate 416 is counterbored so that each of the four holes 420 has a large diameter upper portion 422 and a slightly smaller diameter lower portion 424 so that the smaller diameter lower portion 424 of each hole 420 forms an inner lip or ledge 426.

A second alignment plate 430 is positioned over the first spacer plate 416. The second alignment plate 430 is advantageously identical to the first alignment plate 410 described above, and thus also has the four identical hole patterns 414.

A second spacer plate 432 is positioned over the second alignment plate 430. The second spacer plate 432 is advantageously identical to the first spacer plate 416 and includes the four large holes in alignment with the hole patterns 414 of the second alignment plate.

The second spacer plate 432 is followed in sequence by a third alignment plate 434, a third spacer plate 436, a fourth alignment plate 438, and a fourth spacer plate 440, such that the final tooling assembly comprises four pairs of alignment plates and spacer plates.

The topmost space plate 440 supports a lower carbon alignment disk 442. The lower alignment disk 442 has a pattern of holes formed through it that are advantageously identical to the holes in the alignment plates 410, 430, 434 and 438. As illustrated in the cross-sectional view in FIG. 9, the lower alignment disk 442 has a lower portion 444 having a relatively smaller diameter that conforms to the smaller diameter lower portion 424 of the hole 420 in the uppermost spacer plate 440, and a middle portion 446 having a relatively larger diameter that conforms to the diameter of the large diameter portion of the hole 420 in the uppermost spacer plate 440. Thus, the lower alignment disk 442 is supported by the lip 426 and is aligned by the hole 412 in the uppermost alignment plate 438. The lower alignment disk 442 also has an upper portion having a smaller diameter than the middle portion. The diameter of the upper portion of the lower alignment disk 442 is selected to conform with the inside diameter of the base casing 104 (FIGS. 1 and 2). The diameter of the large diameter portion of the hole 420 is selected to conform with the outer diameter of the base casing 104 so that the base casing 104 is secured between the lower alignment disk 442 and the perimeter of the hole 420.

The lower alignment disk 442 supports the glass bead 105. The glass bead 105 has a first plurality of holes that pass through the entire thickness of the glass bead 105 to provide support for the pins 120 for providing electrical connections, and the glass bead 105 has a second plurality of holes that enter one surface of the glass bead 105 but do not penetrate through to the other surface. For example, the second plurality of holes may penetrate approximately one-half to three-quarters of the bead thickness. The second plurality of holes provide support and positioning for the rods 110 and the support members 116.

Prior to placement of the glass bead 105 on the lower alignment disk 442, the rods 110, the support members 116 and the pins 120 are positioned in the holes in the alignment plates 410, 430, 434 and 438. Because the pins 120 and the support members 116 are not all the same length in the finished sensor 100, a plurality of length adjustment rods 448 are provided in the oven tooling assembly 400. The length adjustment rods 448 are positioned in the holes in the patterns 414 of the alignment plates 410, 430,434 and 438 so that one end of each rod 448 rests on the surface of the bottom plate 402. For example, the length of each length adjustment rod 448 for the sixteen rods 110 is selected so that the lower end of the rod 110 (as viewed in FIG. 9) will be at the appropriate distance from the surface of the glass bead 105. The length of the rod 110 is selected to cause the upper end of the rod 110 to be in the glass bead 105. To make a rod extend farther from the surface of the glass bead 105, the length of the corresponding length adjustment rod 448 is selected to be shorter. To make a rod extend a shorter distance from the surface of the glass bead 105, the length of the corresponding length adjustment rod 448 is selected to be longer. The lengths of the pin 120 making external electrical connections are selected to be sufficient to extend through the glass bead 105 after it is placed on the lower alignment disk 442.

To assist in positioning the length adjustment rods 448, the length adjustment rods are advantageously positioned in the holes of the first and second alignment plates 410, 430 prior to adding the third and fourth alignment plates 434, 438 to the stacks.

As discussed above, the pin 120*a* making the electrical connection to the collector 140 has a shield tube 146 around it (FIG. 3). In order to position the shield tube 146 in the glass bead 105, the glass bead 105 has the corresponding hole 450 enlarged to receive the shield tube 146. Because the shield tube 146 extends beyond the surface of the glass bead 105, the lower alignment disk 442 has a countersunk hole 452 of larger diameter around the hole that receives the collector pin 120*a*. The shield tube 146 is placed in the countersunk hole 452 around the collector pin 120*a*. The glass bead 105 is then positioned over the ends of the rods 110, the support members 116 and the pins 120 and is moved down until the glass bead 105 rests on the upper surface of the lower alignment disk 442. The space between the collector pin 120*a* and the inner surface of the shield tube 146 is filled with very fine glass pellets comprising the same type of glass as the glass bead 105. Any glass pellets that drop on the surface of the glass bead 105 will flow into the glass seal 106 after the glass bead 105 is heated.

After positioning the glass bead 105 over the rods 110, the support members 116 and the pins 120, the base casing 104 is positioned over the upper portion 446 of the lower alignment disk 442, as discussed above. An upper carbon alignment disk 454 having a plurality of appropriately spaced holes is then positioned over the ends of the pins 120 extending through the glass bead 105 to maintain the alignment of the pins 120. As with the lower alignment disk 442, the upper alignment disk 454 has a countersunk hole 450 to accommodate the larger diameter of the shield tube 146 (FIG. 11). The upper alignment disk 454 has a first diameter selected to conform with the inner diameter of the base casing 104 of the sensor 100. The upper alignment disk 454 has a second diameter selected to conform with a small ridge 456 formed on the inside of the base casing 104. This permits the weight of the upper alignment disk to be supported by the ridge 456 of the base casing 104 and not by the glass bead 105. The ridge 456 also prevents the upper alignment disk 454 from moving downward as the glass bead 105 is heated beneath it. Thus, the upper alignment disk 454 remains stationary to hold the pins 120 securely as the glass bead 105 is heated and melted into the hardened glass seal 106.

The same alignment procedure is repeated for each of the four patterns in the alignment plates, assuming that four sensors 100 are to be manufactured at the same time. Thereafter, an upper support plate 460 having a similar construction to the lower support plate 402 is positioned over the four vertical columns 404 to hold the four vertical columns 404 in alignment. The completed structure is then placed in an oven and heated at 1000° C. for approximately 2 hours. During the heating process, the glass bead 105 reflows to cause it to form against the inner walls of the base casing 104 and to cause it to securely grasp each of the rods 110, the support members 116, and the pins 120 so that they are held in secure alignment. Upon cooling, the glass bead transforms into the hardened glass seal 106 which forms a tight hermetic seal so that no gases escape or enter the chamber into which the sensor 100 is inserted. The glass beads within the shield tube 146 likewise melt to form a seal between the pin 120*a* and the shield tube 146.

The glass bead 105 does not stick to the carbon upper alignment disk 454 and lower alignment disk 442 during the heating process. After the heating process is completed and the assembly has had the opportunity to cool, the sensors 100 are removed by removing the upper support plate 460 and pulling the sensors 100 out vertically. The upper alignment disk 454 is removed from the base casing 104. Thereafter, the various interconnections are made between the rods 110, the support members 116 and the pins 120 as discussed above in reference to FIGS. 1–3.

If the tooling assembly is to be used to manufacture further identical gas sensors, it is not necessary to remove the lower alignment disk 442 or any of the alignment plates 410, 430, 434 or 438 or spacer plates 416, 432, 436 or 440. Further, the height adjustment rods 448 may remain in place. Thus, when the next sensors 100 are to be manufactured, it is only necessary to drop in the appropriate length rods 10, support member 116 and pins 120 as well as the shield tube 146, position the glass bead 105, add the glass pellets, position the base casing 104, and place the upper alignment disk 454 over the pins 120. The upper support plate 460 is then positioned on the vertical columns 404, and the structure is again ready to be placed in the oven. Thus, the present invention is simple to manufacture.

The foregoing description illustrates a residual gas sensor comprising an array of quadrupoles which is small in size and easy to manufacture. The manufacturing process of using a tooling assembly to correctly position the rods comprising the array and reflowing a glass bead to secure the rods into these positions simplifies the manufacturing of residual gas sensors and permits gas sensors to be produced in an inexpensive fashion. Further, this process can be used to produce residual gas sensors with small diameter rods.

Small diameter rods allows for the construction of quadrupoles which occupy a small area. Consequently, this manufacturing process allows for the construction of a sensor using an array of quadrupoles. A sensor having an array of quadrupoles where each of the quadrupoles can be tuned for the same ionized gas molecules is more sensitive than a single quadrupole sensor. Further, since the sensitivity of the sensor is enhanced by increasing the number of quadrupoles within the array, the channel length of each of the quadrupoles can be reduced. This permits the array based sensor of the present invention to operate at higher pressures than sensors of the prior art.

Although the preferred embodiments of the present invention have been principally shown and described as relating to a residual gas sensor comprising an array of nine quadrupoles, the present invention could also include a sensor comprising an array of more than nine quadrupoles without departing from the spirit of the invention. Consequently, although the above detailed description has shown, described and pointed out the fundamental novel features of the invention in one particular embodiment, it will be understood that various omissions and substitutions and changes in the form and detail of the device illustrated may be made by those skilled in the art, without departing from the spirit of the invention.

What is claimed is:

1. A gas sensor for measuring the presence of gas ions, comprising:

a base;

a plurality of rods arranged in parallel and spaced apart from each other to form an array of quadrupoles, wherein said rods are fixedly positioned in said base, said base providing cantilevered support for said rods at one end only;

a first electrical lens to cause gas ions to travel in at least two channels formed by said array of quadrupoles; and a collector mounted within said array of quadrupoles, having a surface positioned within said channels, that outputs an electrical signal responsive to the quantity of gas ions traveling in said channels contacting said surface.

2. The gas sensor as defined in claim 1, wherein each quadrupole of said array of quadrupoles comprises four rods arranged in a square, centered about one of said channels.

3. The gas sensor as defined in claim 2, wherein said plurality of rods comprises sixteen rods forming an array of nine quadrupoles having groups of four rods arranged in a square, centered about a channel, wherein adjacent quadrupoles share adjacent rods.

4. The gas sensor as defined in claim 3, wherein a first voltage is applied to a first pair of rods of each of said quadrupoles, and a second voltage is applied to a second pair of rods of each of said quadrupoles, so that adjacent rods in each of said quadrupoles receive different voltages and diagonally disposed rods in each of said quadrupoles receive the same voltage.

5. The gas sensor as defined in claim 4, wherein said first and second voltages have a DC component and an AC component so that said AC component of said first voltage and said AC component of said second voltage have the same frequency and amplitude with a phase difference of a 180°.

6. The gas sensor as defined in claim 5, wherein the first and second voltages generate a fluctuating electric field within said channel.

7. The gas sensor as defined in claim 6, wherein said fluctuating electric field can be tuned to permit gas ions having a specific Atomic Mass Unit (AMU) to contact said collector.

8. The gas sensor as defined in claim 7, further comprising an interface for receiving commands from a computer, said interface responding to said commands to apply voltages to said rods thereby sequentially tuning said electric field for each ion having an Atomic Mass Unit within a selected range of Atomic Mass Units.

9. The gas sensor as defined in claim 8, wherein said interface sends a signal to said computer indicative of the presence and quantity of an ion having a first Atomic Mass Unit.

10. A gas sensor for measuring the presence of gas ions, comprising:

a base;

a plurality of rods arranged in parallel and spaced apart from each other to form an array wherein said rods are fixedly positioned in said base, said base providing cantilevered support for said rods at one end only;

a first electrical lens to cause gas ions to travel in at least one channel formed by said array of said rods; and a collector mounted within said array, having a surface positioned within said at least one channel, that outputs an electrical signal responsive to the quantity of gas ions traveling in said channels contacting said surface, wherein said base comprises a glass seal formed by reflowing a pre-formed glass bead having appropriately positioned holes for said plurality of rods and said plurality of pins.

11. The gas sensor as defined in claim 10, wherein said glass bead comprises barium alkali glass.

12. The gas sensor as defined in claim 10, wherein:

said sensor further comprises a plurality of pins providing electrical connections said first electrical lens, said collector and said rods; and said glass seal supports said pins and further provides a seal to prevent escape of said gases along said pins.

13. A residual gas sensor for use in a low pressure chamber comprising:

a plurality of rods arranged in parallel and spaced apart from each other to form an array wherein said rods are fixedly positioned within a glass seal to maintain said array, said glass seal further providing a seal to prevent escape of gases from said low pressure chamber;

means for ionizing gas molecules present within said low pressure chamber;

means for inducing ionized gas molecules to travel in at least one of a plurality of channels formed by said array of said rods;

means for selectively tuning an oscillating electric field within said plurality of channels; and means for detecting ionized gas molecules having traveled a pre-selected distance within said channel.

14. The residual gas sensor as defined in claim 13, wherein said means for ionizing gas molecules comprises a filament for generating electrons and a ionization chamber mounted adjacent to said plurality of rods, wherein said electrons enter said ionization chamber and collide with said gas molecules.

15. The residual gas sensor as defined in claim 13, wherein said means for inducing ionized gas molecules to travel in at least one of said channels comprises a lens with a plurality of openings respectively centered on said channels, and a voltage source supplying a voltage to said lens which causes said ions to move out of said ionization chamber into said channels.

16. The residual gas sensor as defined in claim 13, wherein said means for selectively tuning said oscillating electric field within said plurality of channels comprises a first voltage source applying a first voltage to a first number of said rods adjacent to said channels, and a second voltage source applying a second voltage to a second number of said rods adjacent to said channels.

17. The residual gas sensor as defined in claim 16, wherein said first and second voltage sources can be selectively programmed to tune said oscillating electric field within said channels to permit only a first number of said ionized gas molecules having a selected Atomic Mass Unit to be detected by said means for detecting ionized gas molecules.

18. The residual gas sensor as defined in claim 13, wherein said means for detecting ionized gas molecules comprises a collector, having surfaces within each of said channels, which outputs a signal indicative of the number of ions colliding with said surfaces.

19. The residual gas sensor as defined in claim 13, wherein said plurality of rods comprises sixteen rods arranged in an array forming nine quadrupoles wherein adjacent quadrupoles share adjacent rods.

20. The residual gas sensor as defined in claim 13, wherein said glass seal is formed by reflowing a preformed glass bead having appropriately positioned holes for said plurality of rods, said glass bead comprising barium alkali glass.

21. A gas sensor for measuring the presence of gas ions, comprising:

a base;

a plurality of rods fixedly positioned at one end in said base, each of said rods having a length, said rods arranged in parallel and spaced apart from each other to form an array of quadrupoles;

an electrical lens to cause gas ions to travel in a plurality of channels formed by said array of said rods, each channel corresponding to one quadrupole in said array of quadrupoles; and a collector mounted within said array, said collector having a surface portion positioned within each of said channels, said collector outputting an electrical signal responsive to the quantity of gas ions traveling in said channels and contacting said surface portions, wherein the length of each of said rods is chosen to be sufficiently short that said gas sensor can operate at pressures as high as $1.5\times10^{-2}$ torr.

* * * * *